United States Patent
Miao

(10) Patent No.: US 12,119,945 B2
(45) Date of Patent: Oct. 15, 2024

(54) HYBRID AUTOMATIC REPEAT REQUEST FEEDBACK FOR WIRELESS COMMUNICATION

(71) Applicant: Apple Inc., Cupertino, CA (US)

(72) Inventor: Honglei Miao, Munich (DE)

(73) Assignee: Apple Inc., Cupertino, CA (US)

( * ) Notice: Subject to any disclaimer, the term of this patent is extended or adjusted under 35 U.S.C. 154(b) by 606 days.

(21) Appl. No.: 17/262,433

(22) PCT Filed: Sep. 12, 2019

(86) PCT No.: PCT/US2019/050711
§ 371 (c)(1),
(2) Date: Jan. 22, 2021

(87) PCT Pub. No.: WO2020/056068
PCT Pub. Date: Mar. 19, 2020

(65) Prior Publication Data
US 2021/0297199 A1    Sep. 23, 2021

Related U.S. Application Data

(60) Provisional application No. 62/730,978, filed on Sep. 13, 2018.

(51) Int. Cl.
*H04L 1/1867* (2023.01)
*H04W 72/20* (2023.01)
*H04W 92/18* (2009.01)

(52) U.S. Cl.
CPC ........... *H04L 1/1896* (2013.01); *H04L 1/189* (2013.01); *H04W 72/20* (2023.01); *H04W 92/18* (2013.01)

(58) Field of Classification Search
CPC ............. H04W 72/1268; H04W 28/02; H04L 5/0092; H04L 47/283; H04L 1/1812; H04L 1/08
See application file for complete search history.

(56) References Cited

U.S. PATENT DOCUMENTS

2017/0034799 A1    2/2017 Kim et al.
2018/0034683 A1*   2/2018 Li ..................... H04W 52/04
(Continued)

FOREIGN PATENT DOCUMENTS

CA    3008125    7/2017
CN    105493597    4/2016
(Continued)

OTHER PUBLICATIONS

International Search Report and Written Opinion for Application No. PCT/US2019/050711, mailed Feb. 10, 2020; 10 pages.
(Continued)

*Primary Examiner* — Iqbal Zaidi
(74) *Attorney, Agent, or Firm* — Kowert, Hood, Munyon, Rankin & Goetzel, P.C.

(57) ABSTRACT

The present disclosure includes methods and devices for NACK feedback based HARQ retransmission scheme in a wireless communication network. The method includes receiving mobile radio communication terminal devices transmitting NACK feedback signaled time-frequency resources and transmitting mobile radio communication terminal devices performing retransmission of the previously sent messages based on receiving NACK feedback.

18 Claims, 16 Drawing Sheets

(56) References Cited

U.S. PATENT DOCUMENTS

| | | | |
|---|---|---|---|
| 2018/0159668 A1 | 6/2018 | Phuyal et al. | |
| 2018/0176747 A1 | 6/2018 | Li et al. | |
| 2019/0052436 A1* | 2/2019 | Desai | H04L 5/0055 |
| 2020/0099476 A1* | 3/2020 | Park | H04W 4/70 |

FOREIGN PATENT DOCUMENTS

| | | |
|---|---|---|
| CN | 105659688 | 6/2016 |
| CN | 108400843 | 8/2018 |
| EP | 3295591 A1 | 3/2018 |
| EP | 3662686 A1 | 6/2020 |
| KR | 1020170031174 A | 3/2017 |
| WO | 2011025825 A1 | 3/2011 |
| WO | 2018080565 A1 | 5/2018 |
| WO | 2018084608 A2 | 5/2018 |
| WO | 2018135920 A1 | 7/2018 |
| WO | 2018160372 A1 | 9/2018 |

OTHER PUBLICATIONS

Office Action for EP Patent Application No. 19859766.8; 10 pages; May 31, 2022.

Extended European Search Report for EP Patent Application No. 19859766.8; Oct. 20, 2021.

"3rd Generation Partnership Project; Technical Specification Group Radio Access Network; Evolved Universal Terrestrial Radio Access (E-UTRA); Medium Access Control (MAC) protocol specification" 3GPP TS 36.321 v15.5.0 (Jul. 2018) (Release 15).

Notice of Grant for CN Patent Application No. 201980057979.7; Feb. 8, 2024.

Catt "Discussion on TP on transmit power for D2D"; 3GPP TSG RAN WG1 Meeting #80 R1-150091; Feb. 9, 2015.

Yang et al. "Enhanced Application of DCD Communication in LTE Systems"; Shanghai Informatization, Issue 05; May 10, 2017.

* cited by examiner

FIG. 15A (a) Initial transmission: Omni-directional group-cast

FIG. 15B (b) Beamformed retransmission

HYBRID AUTOMATIC REPEAT REQUEST FEEDBACK FOR WIRELESS COMMUNICATION

RELATED APPLICATION(S)

This application is a national stage application of International Application No. PCT/US2019/050711, filed Sep. 12, 2019, titled "Hybrid Automatic Repeat Request Feedback For Wireless Communication", which claims the benefit of priority to U.S. Provisional App. No. 62/730,978, filed Sep. 13, 2018, titled "Hybrid Automatic Repeat Request (HARQ) Feedback For New Radio (NR) Vehicle-to-Vehicle (V2V) Groupcast Communication. The aforementioned applications are hereby incorporated by reference in their entireties.

TECHNICAL FIELD

Various embodiments relate generally to the field of wireless communications.

BACKGROUND

New radio (NR) vehicle-to-everything V2X aims to support unicast, groupcast and broadcast communication over the sidelink and required schemes for physical layer procedures, resource allocation and configuration mechanisms, and QoS management. The SI also targets to address the coexistence issue of advanced V2X services provided by the NR sidelink and those facilitated by the LTE sidelink. In NR Uu interface, the large level of flexibility and scalability are very crucial to fulfill the requirements of diverse 5G use cases. And the flexibility and scalability are inherent to numerous design aspects including the modulation schemes, frame structure, reference signals, and multi-antenna transmission etc. Similarly, it may be advantageous that the NR sidelink design can reuse the NR Uu physical layer design principles in regard to flexibility and scalability, e.g., by virtue of configurable numerology, frame structure and reference signals etc so as to support diverse use cases with extreme requirements, as well as a wide range of frequencies and deployment options.

A large number of different advanced V2X use cases may be supported by groupcast traffic, thereby a group of UEs may support a specific advanced application and therefore dedicated communication to those UEs is required. For example, some of these applications includes object/sensor sharing, sharing of path planning information and platooning. The amount of data required to be transmitted in groupcast communication can involve medium intensity traffic and can be applied in the ITS-G5 band. Moreover, many of the advanced applications employing groupcast in NR-V2X require smaller latency as well as higher reliability. Therefore, it can be beneficial to apply feedback based HARQ scheme for sidelink communication.

SUMMARY

Various embodiments of the present disclosure relate to NACK feedback based HARQ retransmission scheme for wireless communications (e.g., NR V2V groupcast communications). For example, the following methods can enable HARQ retransmission on mobile radio communication terminal devices for wireless communication (e.g., V2V groupcast communication, NR V2V unicast communications.)

In some embodiments, a NACK feedback based HARQ retransmission method includes NACK time-frequency resources being signaled in the SCI which schedules the (e.g., V2V groupcast) PSSCH data. Those receiving mobile radio communication terminals (e.g., V2V-RX UEs) which fail to correctly decode the PSSCH shall transmit NACK feedback by using the signaled time-frequency resources. Upon the reception of NACK feedback, a transmitting mobile radio communication terminal (e.g., V2V-TX UE) can perform the retransmission of the previously scheduled PSSCH data. The transmitting mobile radio communication terminal (e.g., V2V-TX UE) stops the retransmission until the maximum number of retransmission is reached or no NACK feedback is received. In various embodiments, maximum repetition level of NACK feedback can be also signaled in SCI to allow receiving mobile radio communication terminal (e.g., V2V-RX UE) to realize link adaptation for NACK transmission. NACK feedback sequence can be V2V-TX UE-specific or TF resource specific.

In some embodiments, a NACK feedback based HARQ retransmission method includes NACK feedback messages signalling the preferred the beam direction for the retransmission so as to enhance the reliability and control the interference for the retransmission. A transmitting mobile radio communication terminal device (e.g., V2V-TX UE) transmits periodic/aperiodic beam-specific reference signal, e.g. CSI-RS or SRS, so that receiving mobile radio communication terminal device (e.g., V2V-RX UE) can determine the preferred beam direction based on the RSRP of these beamformed RS.

In at least one exemplary embodiment, the beamforming is implemented by having each SCI-signaled NACK resource associated with a particular beam direction, and then the receiving mobile radio communication terminal device (e.g., V2V-RX UE) selects the NACK resource associated with the preferred retransmission beam direction for the NACK feedback.

In at least one other exemplary embodiment, the beamforming is implemented by having each SCI-signaled NACK sequence associated with a particular beam direction, and then the receiving mobile radio communication terminal device (e.g., V2V-RX UE) selects the NACK sequence associated with the preferred retransmission beam direction for the NACK feedback.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1:
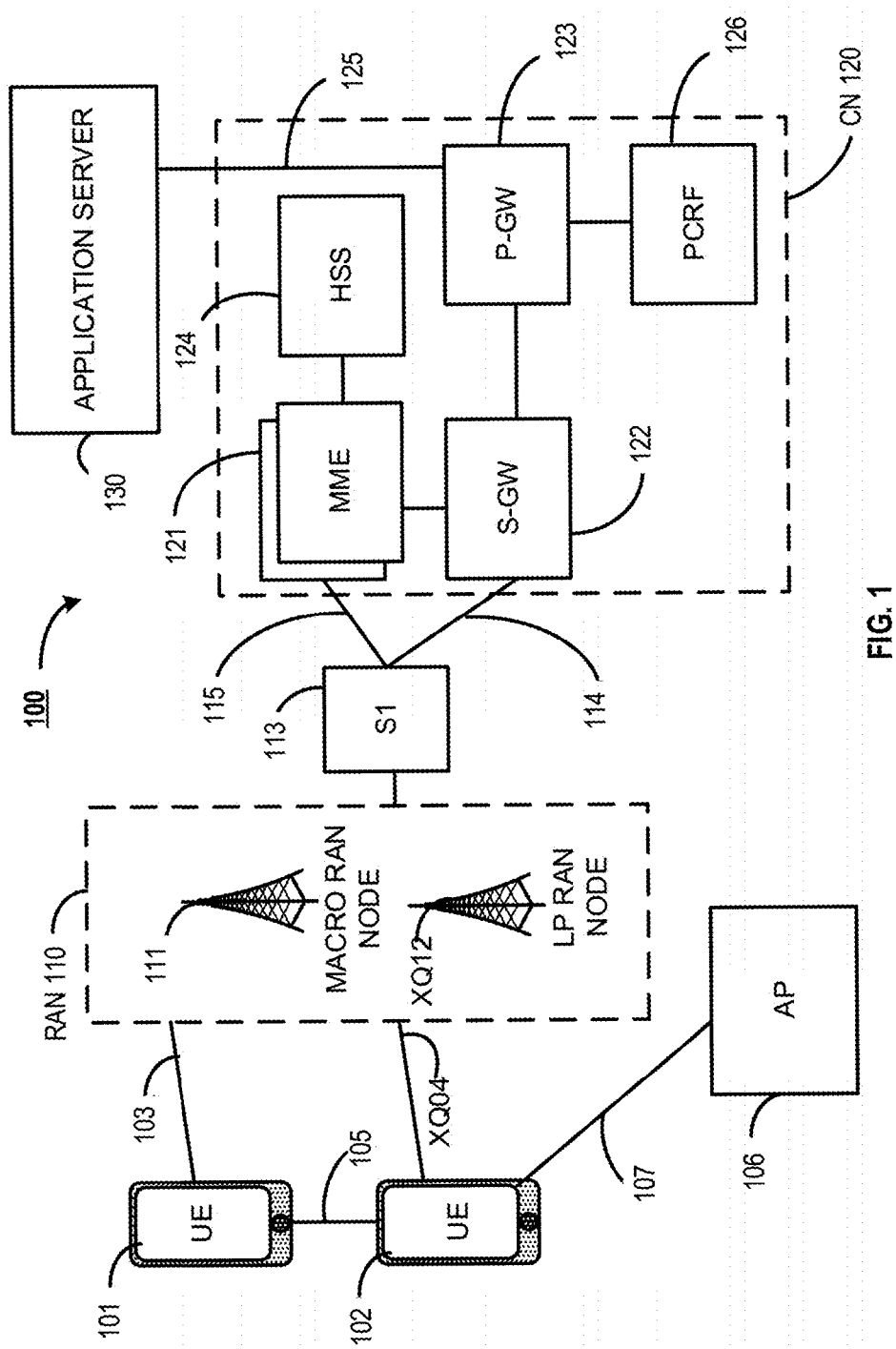
FIG. 1 illustrates an architecture of a system of a network in accordance with various embodiments.

FIG. 1 illustrates an architecture of a system 100 of a network in accordance with some embodiments. The system 100 is shown to include a user equipment (UE) 101 and a UE 102. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 101 and 102 are illustrated as smartphones (e.g., handheld touchscreen mobile computing devices connectable to one or more cellular networks), but may also include any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 101 and 102 may include an Internet of Things (IoT) UE, which may include a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections (or channels) 103 and 104, respectively, each of which includes a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink (SL) interface including one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 105 may be used in vehicular applications and communications technologies, which are often referred to as V2X systems. V2X is a mode of communication where UEs (for example, UEs 101, 102) communicate with each other directly over the PC5/SL interface 105 and can take place when the UEs 101, 102 are served by RAN nodes 111, 112 or when one or more UEs are outside a coverage area of the RAN 110. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vehicle UEs (vUEs) 101, 102, RAN nodes 111, 112, application servers 130, and pedestrian UEs 101, 102 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 101, 102 may be implemented/employed as Vehicle Embedded Communications Systems (VECS) or vUEs.

The UE 102 is shown to be configured to access an access point (AP) 106 (also referred to as "WLAN node 106", "WLAN 106", "WLAN Termination 106" or "WT 106" or the like) via connection 107. The connection 107 may include a local wireless connection, such as a connection consistent with any IEEE 802.11 protocol, wherein the AP 106 may include a wireless fidelity (WiFi®) router. In this example, the AP 106 is shown to be connected to the Internet without connecting to the core network of the wireless system (described in further detail below). In various embodiments, the UE 102, RAN 110, and AP 106 may be configured to utilize LTE-WLAN aggregation (LWA) operation and/or WLAN LTE/WLAN Radio Level Integration with IPsec Tunnel (LWIP) operation. The LWA operation may involve the UE 102 in RRC_CONNECTED being configured by a RAN node 111, 112 to utilize radio resources of LTE and WLAN. LWIP operation may involve the UE 102 using WLAN radio resources (e.g., connection 107) via Internet Protocol Security (IPsec) protocol tunneling to authenticate and encrypt packets (e.g., internet protocol (IP) packets) sent over the connection 107. IPsec tunneling may include encapsulating entirety of original IP packets and adding a new packet header, thereby protecting the original header of the IP packets.

The RAN 110 can include one or more access nodes that enable the connections 103 and 104. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and may include ground stations (e.g., terrestrial access points) or satellite stations providing coverage within a geographic area (e.g., a cell). The term "Road Side Unit" or "RSU" may refer to any transportation infrastructure entity implemented in or by a gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals may include a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 includes the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may include a database for network users, including subscription-related information to support the network entities' handling of communication sessions. The CN 120 may include one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 120 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
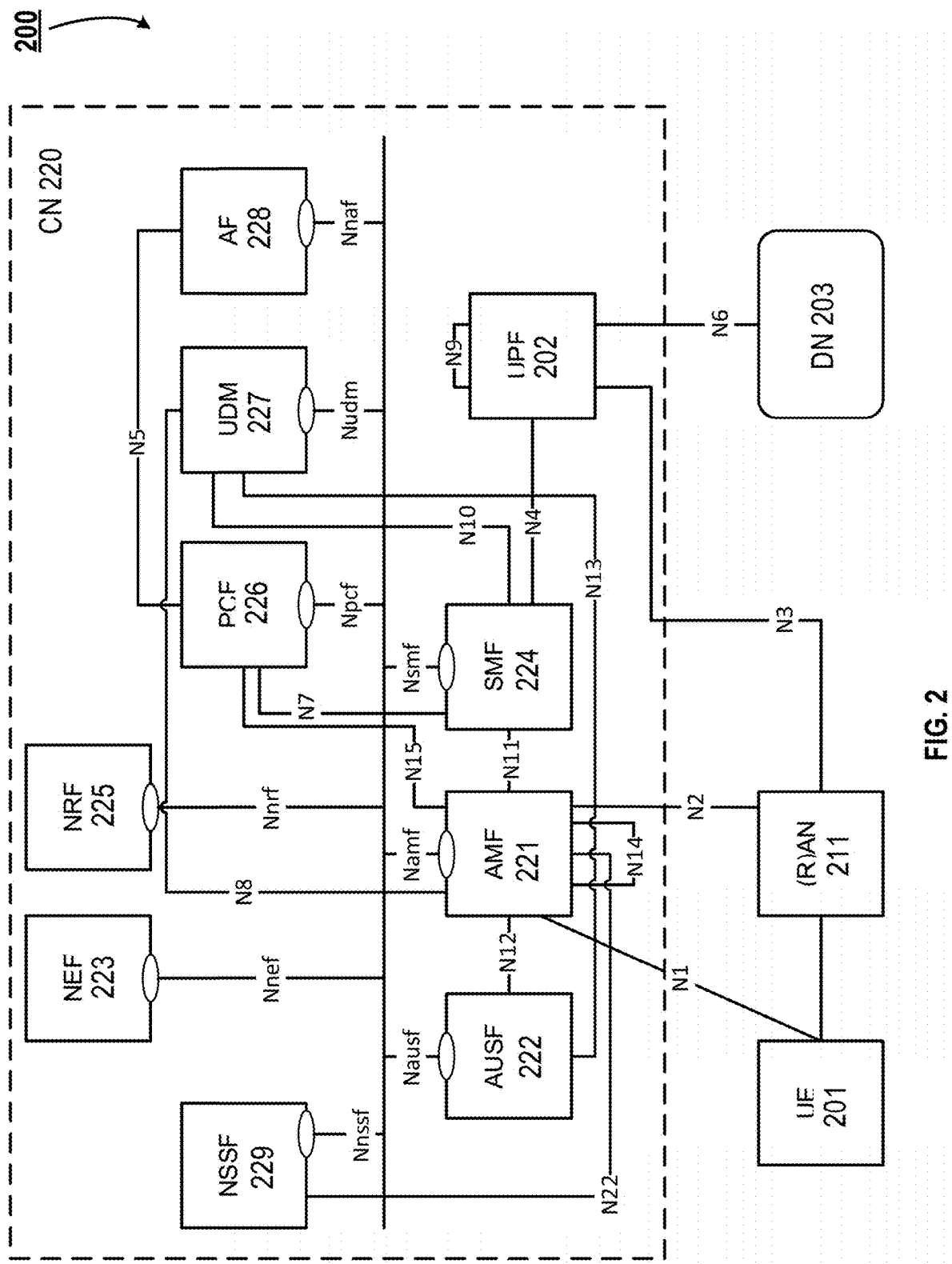
FIG. 2 illustrates an architecture of a system of a network in accordance with various embodiments.

FIG. 2 illustrates an architecture of a system 200 of a network in accordance with some embodiments. The system 200 is shown to include a UE 201, which may be the same or similar to UEs 101 and 102 discussed previously; a RAN node 211, which may be the same or similar to RAN nodes 111 and 112 discussed previously; a Data Network (DN) 203, which may be, for example, operator services, Internet access or 3rd party services; and a 5G Core Network (5GC or CN) 220.

The CN 220 may include an Authentication Server Function (AUSF) 222; an Access and Mobility Management Function (AMF) 221; a Session Management Function (SMF) 224; a Network Exposure Function (NEF) 223; a Policy Control Function (PCF) 226; a Network Function (NF) Repository Function (NRF) 225; a Unified Data Management (UDM) 227; an Application Function (AF) 228; a User Plane Function (UPF) 202; and a Network Slice Selection Function (NSSF) 229.

The UPF 202 may act as an anchor point for intra-RAT and inter-RAT mobility, an external PDU session point of interconnect to DN 203, and a branching point to support multi-homed PDU session. The UPF 202 may also perform packet routing and forwarding, perform packet inspection, enforce user plane part of policy rules, lawfully intercept packets (UP collection), traffic usage reporting, perform QoS handling for user plane (e.g., packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 202 may include an uplink classifier to support routing traffic flows to a data network. The DN 203 may represent various network operator services, Internet access, or third party services. DN 203 may include, or be similar to, application server 130 discussed previously. The UPF 202 may interact with the SMF 224 via an N4 reference point between the SMF 224 and the UPF 202.

The AUSF 222 may store data for authentication of UE 201 and handle authentication related functionality. The AUSF 222 may facilitate a common authentication framework for various access types. The AUSF 222 may communicate with the AMF 221 via an N12 reference point between the AMF 221 and the AUSF 222; and may communicate with the UDM 227 via an N13 reference point between the UDM 227 and the AUSF 222. Additionally, the AUSF 222 may exhibit an Nausf service-based interface.

The AMF 221 may be responsible for registration management (e.g., for registering UE 201, etc.), connection management, reachability management, mobility management, and lawful interception of AMF-related events, and access authentication and authorization. The AMF 221 may be a termination point for an N11 reference point between the AMF 221 and the SMF 224. The AMF 221 may provide transport for Session Management (SM) messages between the UE 201 and the SMF 224, and act as a transparent proxy for routing SM messages. AMF 221 may also provide transport for short message service (SMS) messages between UE 201 and an SMS function (SMSF) (not shown by FIG. 2). AMF 221 may act as Security Anchor Function (SEAF), which may include interaction with the AUSF 222 and the UE 201, as well as receipt of an intermediate key that was established as a result of the UE 201 authentication process. Where UMTS Subscriber Identity Module (USIM) based authentication is used, the AMF 221 may retrieve the security material from the AUSF 222. AMF 221 may also include a Security Context Management (SCM) function, which receives a key from the SEAF that it uses to derive access-network specific keys. Furthermore, AMF 221 may be a termination point of RAN CP interface, which may include or be an N2 reference point between the (R)AN 211 and the AMF 221; and the AMF 221 may be a termination point of NAS (N1) signalling, and perform NAS ciphering and integrity protection.

AMF 221 may also support NAS signalling with a UE 201 over an N3 interworking-function (IWF) interface. The N3IWF may be used to provide access to untrusted entities. N3IWF may be a termination point for the N2 interface between the (R)AN 211 and the AMF 221 for the control plane, and may be a termination point for the N3 reference point between the (R)AN 211 and the UPF 202 for the user plane. As such, the AMF 221 may handle N2 signalling from the SMF 224 and the AMF 221 for PDU sessions and QoS, encapsulate/de-encapsulate packets for IPSec and N3 tunnelling, mark N3 user-plane packets in the uplink, and enforce QoS corresponding to N3 packet marking, which may take into account QoS requirements associated to such marking received over N2. N3IWF may also relay uplink and downlink control-plane NAS signalling between the UE 201 and AMF 221 via an N1 reference point between the UE 201 and the AMF 221, and relay uplink and downlink user-plane packets between the UE 201 and UPF 202. The N3IWF also provides mechanisms for IPsec tunnel establishment with the UE 201. The AMF 221 may exhibit an Namf service-based interface, and may be a termination point for an N14 reference point between two AMFs 221 and an N17 reference point between the AMF 221 and a 5G-Equipment Identity Register (5G-EIR) (not shown by FIG. 2).

The SMF 224 may be responsible for session management (e.g., session establishment, modify and release, including tunnel maintain between UPF and AN node). The SMF 224 may also allocate and manage UE IP addresses (including optional authorization), select and control UP functions, and configures traffic steering at the UPF 202 to route traffic to a proper destination. The SMF 224 may also terminate interfaces towards Policy Control Functions, control part of policy enforcement and QoS, and perform lawful interception (e.g., for SM events and interface to LI system). The SMF 224 may also terminate SM parts of NAS messages, provide downlink data notification, and initiate AN specific SM information, sent via AMF over N2 to AN, and determine Session and Service Continuity (SSC) mode of a session.

The SMF 224 may include the following roaming functionality: handle local enforcement to apply QoS SLAs (VPLMN); charging data collection and charging interface (VPLMN); lawful intercept (in VPLMN for SM events and interface to LI System); and support for interaction with external DN for transport of signalling for PDU session authorization/authentication by external DN. An N16 reference point between two SMFs 224 may be included in the system 200, which may be between another SMF 224 in a visited network and the SMF 224 in the home network in roaming scenarios. Additionally, the SMF 224 may exhibit the Nsmf service-based interface.

The NEF 223 may provide means for securely exposing the services and capabilities provided by 3GPP network functions for third party, internal exposure/re-exposure, Application Functions (e.g., AF 228), edge computing or fog computing systems, etc. In such embodiments, the NEF 223 may authenticate, authorize, and/or throttle the AFs. NEF 223 may also translate information exchanged with the AF 228 and information exchanged with internal network functions. For example, the NEF 223 may translate between an AF-Service-Identifier and an internal 5GC information. NEF 223 may also receive information from other network functions (NFs) based on exposed capabilities of other network functions. This information may be stored at the NEF 223 as structured data, or at a data storage NF using standardized interfaces. The stored information can then be re-exposed by the NEF 223 to other NFs and AFs, and/or used for other purposes such as analytics. Additionally, the NEF 223 may exhibit an Nnef service-based interface.

The NRF 225 may support service discovery functions, receive NF Discovery Requests from NF instances, and provide the information of the discovered NF instances to the NF instances. NRF 225 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 225 may exhibit the Nnrf service-based interface.

The PCF 226 may provide policy rules to control plane function(s) to enforce them, and may also support unified policy framework to govern network behavior. The PCF 226 may also implement a front end (FE) to access subscription information relevant for policy decisions in a Unified Data Repository (UDR) of the UDM 227. The PCF 226 may communicate with the AMF 221 via an N15 reference point between the PCF 226 and the AMF 221, which may include a PCF 226 in a visited network and the AMF 221 in case of roaming scenarios. The PCF 226 may communicate with the AF 228 via an N5 reference point between the PCF 226 and the AF 228; and with the SMF 224 via an N7 reference point between the PCF 226 and the SMF 224. The system 200 and/or CN 220 may also include an N24 reference point between the PCF 226 (in the home network) and a PCF 226 in a visited network. Additionally, the PCF 226 may exhibit an Npcf service-based interface.

The UDM 227 may handle subscription-related information to support the network entities' handling of communication sessions, and may store subscription data of UE 201. For example, subscription data may be communicated between the UDM 227 and the AMF 221 via an N8 reference point between the UDM 227 and the AMF 221 (not shown by FIG. 2). The UDM 227 may include two parts, an application FE and a User Data Repository (UDR) (the FE and UDR are not shown by FIG. 2). The UDR may store subscription data and policy data for the UDM 227 and the PCF 226, and/or structured data for exposure and application data (including Packet Flow Descriptions (PFDs) for application detection, application request information for multiple UEs 201) for the NEF 223. The Nudr service-based interface may be exhibited by the UDR to allow the UDM 227, PCF 226, and NEF 223 to access a particular set of the stored data, as well as to read, update (e.g., add, modify), delete, and subscribe to notification of relevant data changes in the UDR. The UDM 227 may include a UDM FE, which is in charge of processing credentials, location management, subscription management and so on. Several different front ends may serve the same user in different transactions.

The UDM-FE accesses subscription information stored in the UDR and performs authentication credential processing; user identification handling; access authorization; registration/mobility management; and subscription management. The UDR may interact with the SMF 224 via an N10 reference point between the UDM 227 and the SMF 224. UDM 227 may also support SMS management. An SMS-FE implements the similar application logic as discussed previously. Additionally, the UDM 227 may exhibit the Nudm service-based interface.

The AF 228 may provide application influence on traffic routing, provide access to the Network Capability Exposure (NCE), and interact with the policy framework for policy control. The NCE may be a mechanism that allows the 5GC and AF 228 to provide information to each other via NEF 223, which may be used for edge computing implementations. In such implementations, the network operator and third party services may be hosted close to the UE 201 access point of attachment to achieve an efficient service delivery through the reduced end-to-end latency and load on the transport network. For edge computing implementations, the 5GC may select a UPF 202 close to the UE 201 and execute traffic steering from the UPF 202 to DN 203 via the N6 interface. This may be based on the UE subscription data, UE location, and information provided by the AF 228. In this way, the AF 228 may influence UPF (re)selection and traffic routing. Based on operator deployment, when AF 228 is considered to be a trusted entity, the network operator may permit AF 228 to interact directly with relevant NFs. Additionally, the AF 228 may exhibit an Naf service-based interface.

The NSSF 229 may select a set of network slice instances serving the UE 201. The NSSF 229 may also determine allowed Network Slice Selection Assistance Information (NSSAI) and the mapping to the Subscribed Single-NSSAIs (S-NSSAIs), if needed. The NSSF 229 may also determine the AMF set to be used to serve the UE 201, or a list of candidate AMF(s) 221 based on a suitable configuration and possibly by querying the NRF 225. The selection of a set of network slice instances for the UE 201 may be triggered by the AMF 221 with which the UE 201 is registered by interacting with the NSSF 229, which may lead to a change of AMF 221. The NSSF 229 may interact with the AMF 221 via an N22 reference point between AMF 221 and NSSF 229; and may communicate with another NSSF 229 in a visited network via an N31 reference point (not shown by FIG. 2). Additionally, the NSSF 229 may exhibit an Nnssf service-based interface.

As discussed previously, the CN 220 may include an SMSF, which may be responsible for SMS subscription checking and verification, and relaying SM messages to/from the UE 201 to/from other entities, such as an Short Message Service (SMS)-Global Systems for Mobile Communication (GMSC)/Inter-Working Mobile Switching Center (IWMSC)/SMS-router. The SMS may also interact with AMF 221 and UDM 227 for notification procedure that the UE 201 is available for SMS transfer (e.g., set a UE not reachable flag, and notifying UDM 227 when UE 201 is available for SMS).

The CN 220 may also include other elements that are not shown by FIG. 2, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 2). Individual NFs may share a UDSF for storing their respective unstructured data or individual NFs may each have their own UDSF located at or near the individual NFs. Additionally, the UDSF may exhibit an Nudsf service-based interface (not shown by FIG. 2). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 2 for clarity. In one example, the CN 220 may include an Nx interface, which is an inter-CN interface between the MME (e.g., MME 121) and the AMF 221 in order to enable interworking between CN 220 and CN 120. Other example interfaces/reference points may include an N5g-EIR service-based interface exhibited by a 5G-EIR, an N27 reference point between an NRF in the visited network and the NRF in the home network; and an N31 reference point between the NSSF in the visited network and the NSSF in the home network.

In yet another example, system 200 may include multiple RAN nodes 211 wherein an Xn interface is defined between two or more RAN nodes 211 (e.g., gNBs and the like) connecting to 5GC 220, between a RAN node 211 (e.g., gNB) connecting to 5GC 220 and an eNB (e.g., a RAN node 111 of FIG. 1), and/or between two eNBs connecting to 5GC 220. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; and mobility support for UE 201 in a connected mode (e.g., CM-CONNECTED) including functionality to manage the UE mobility for connected mode between one or more RAN nodes 211.

The mobility support may include context transfer from an old (source) serving RAN node 211 to new (target) serving RAN node 211; and control of user plane tunnels between old (source) serving RAN node 211 to new (target) serving RAN node 211. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be the same or similar to the user plane and/or control plane protocol stack(s) shown and described herein.

Figure 3:
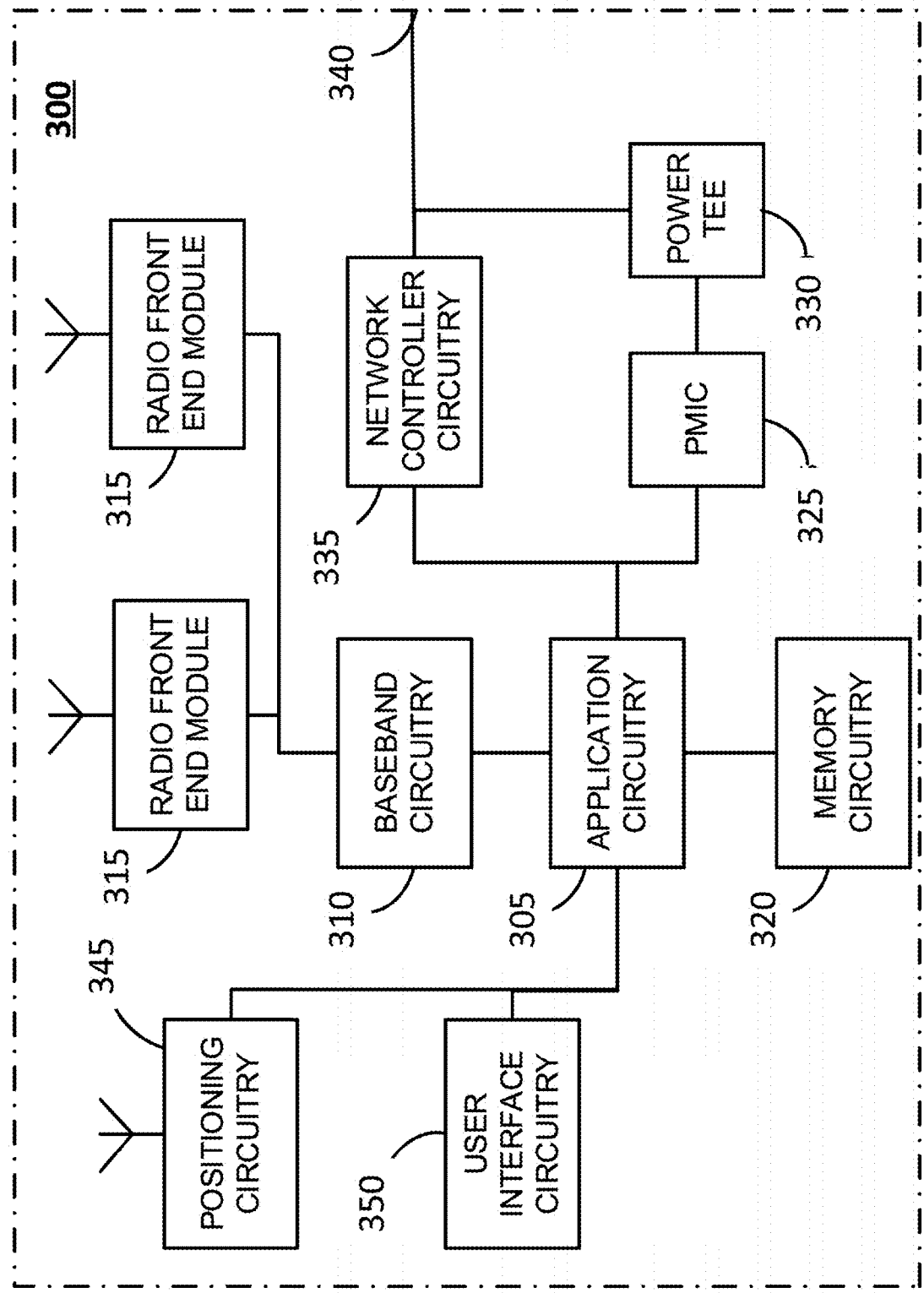
FIG. 3 illustrates an example of infrastructure equipment in accordance with various embodiments.

FIG. 3 illustrates an example of infrastructure equipment 300 in accordance with various embodiments. The infrastructure equipment 300 (or "system 300") may be implemented as a base station, radio head, RAN node, etc., such as the RAN nodes 111 and 112, and/or AP 106 shown and described previously. In other examples, the system 300 could be implemented in or by a UE, application server(s) 130, and/or any other element/device discussed herein. The system 300 may include one or more of application circuitry 305, baseband circuitry 310, one or more radio front end modules 315, memory 320, power management integrated circuitry (PMIC) 325, power tee circuitry 330, network controller 335, network interface connector 340, satellite positioning circuitry 345, and user interface 350. In some embodiments, the device 300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry". As used herein, the term "processor circuitry" may refer to, is part of, or includes circuitry capable of sequentially and automatically carrying out a sequence of arithmetic or logical operations; and recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 120 (or CN 220 discussed previously) may be referred to as "network elements". The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 305 may include one or more central processing unit (CPU) cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 305 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 300 may not utilize application circuitry 305, and instead may include a special-purpose processor/controller to process IP data received from an EPC or 5GC, for example.

Additionally or alternatively, application circuitry 305 may include circuitry such as, but not limited to, one or more field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 305 may include logic blocks or logic fabric including other interconnected resources that may be programmed to perform various functions, such as the procedures, methods, functions, etc. of the various embodiments discussed herein. In such embodiments, the circuitry of application circuitry 305 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in lookup-tables (LUTs) and the like.

The baseband circuitry 310 may be implemented, for example, as a solder-down substrate including one or more integrated circuits, a single packaged integrated circuit soldered to a main circuit board or a multi-chip module containing two or more integrated circuits. Although not shown, baseband circuitry 310 may include one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 310 may include protocol processing circuitry with one or more instances of control circuitry (not shown) to provide control functions for the digital baseband circuitry and/or radio frequency circuitry (for example, the radio front end modules 315).

User interface circuitry 350 may include one or more user interfaces designed to enable user interaction with the system 300 or peripheral component interfaces designed to enable peripheral component interaction with the system 300. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 315 may include a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 315. The RFEMs 315 may incorporate both millimeter wave antennas and sub-millimeter wave antennas.

The memory circuitry 320 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 320 may be implemented as one or more of solder down packaged integrated circuits, socketed memory modules and plug-in memory cards.

The PMIC 325 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 330 may provide for electrical power drawn from a network cable to provide both power supply and data connectivity to the infrastructure equipment 300 using a single cable.

The network controller circuitry 335 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 300 via network interface connector 340 using a physical connection, which may be electrical (commonly referred to as a "copper interconnect"), optical, or wireless. The network controller circuitry 335 may include one or more dedicated processors and/or FPGAs to communicate using one or more of the aforementioned protocol. In some implementations, the network controller circuitry 335 may include multiple controllers to provide connectivity to other networks using the same or different protocols.

The positioning circuitry 345 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 345 may include various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 345 and/or positioning circuitry implemented by UEs 101, 102, or the like) to determine their GNSS position. The GNSS signals may include a pseudo-random code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 345 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine time of flight (ToF) values for each received GNSS signal from the ToAs and the ToTs, and then may determine, from the ToFs, a three-dimensional (3D) position and clock deviation. The 3D position may then be converted into a latitude, longitude and altitude. The positioning circuitry 345 may provide data to application circuitry 305, which may include one or more of position data or time data. Application circuitry 305 may use the time data to synchronize operations with other radio base stations (e.g., RAN nodes 111, 112, 211 or the like).

The components shown by FIG. 3 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 4:
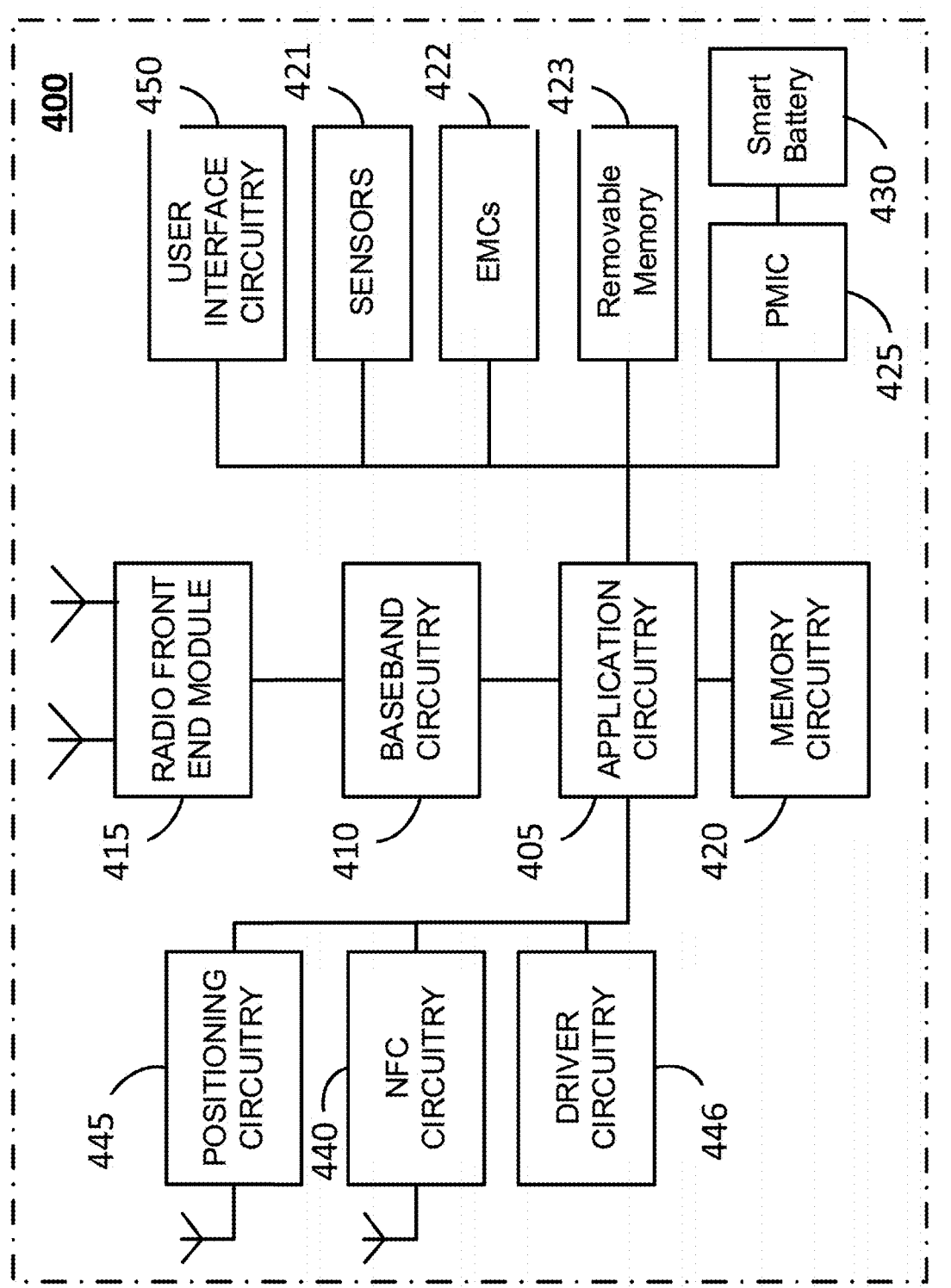
FIG. 4 illustrates an example of a platform (or "device") in accordance with various embodiments.

FIG. 4 illustrates an example of a platform 400 (or "device 400") in accordance with various embodiments. In embodiments, the computer platform 400 may be suitable for use as UEs 101, 102, 201, application servers 130, and/or any other element/device discussed herein. The platform 400 may include any combinations of the components shown in the example. The components of platform 400 may be implemented as integrated circuits (ICs), portions thereof, discrete electronic devices, or other modules, logic, hardware, software, firmware, or a combination thereof adapted in the computer platform 400, or as components otherwise incorporated within a chassis of a larger system. The block diagram of FIG. 4 is intended to show a high level view of components of the computer platform 400. However, some of the components shown may be omitted, additional components may be present, and different arrangement of the components shown may occur in other implementations.

The application circuitry 405 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (10), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 400. In some embodiments, processors of application circuitry 305/405 may process IP data packets received from an EPC or 5GC.

Application circuitry 405 may be or may include a microprocessor, a multi-core processor, a multithreaded processor, an ultra-low voltage processor, an embedded processor, or other known processing element. In one example, the application circuitry 405 may include an Intel® Architecture Core™ based processor, such as a Quark™, an Atom™, an i3, an i5, an 7, or an MCU-class processor, or another such processor available from Intel® Corporation, Santa Clara, CA. The processors of the application circuitry 405 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc.; an ARM-based design licensed from ARM Holdings, Ltd.; or the like. In some implementations, the application circuitry 405 may be a part of a system on a chip (SoC) in which the application circuitry 405 and other components are formed into a single integrated circuit, or a single package, such as the Edison™ or Galileo™ SoC boards from Intel® Corporation.

Additionally or alternatively, application circuitry 405 may include circuitry such as, but not limited to, one or more field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 405 may include logic blocks or logic fabric including other interconnected resources that may be programmed to perform various functions, such as the procedures, methods, functions, etc. of the various embodiments discussed herein. In such embodiments, the circuitry of application circuitry 405 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in lookup-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. Although not shown, baseband circuitry 410 may include one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 410 may include protocol processing circuitry with one or more instances of control circuitry (not shown) to provide control functions for the digital baseband circuitry and/or radio frequency circuitry (for example, the radio front end modules 415).

The radio front end modules (RFEMs) 415 may include a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 415. The RFEMs 415 may incorporate both millimeter wave antennas and sub-millimeter wave antennas.

The memory circuitry 420 may include any number and type of memory devices used to provide for a given amount of system memory. As examples, the memory circuitry 420 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 420 may be developed in accordance with a Joint Electron Devices Engineering Council (JEDEC) low power double data rate (LPDDR)-based design, such as LPDDR2, LPDDR3, LPDDR4, or the like. Memory circuitry 420 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 420 may be on-die memory or registers associated with the application circuitry 405. To provide for persistent storage of information such as data, applications, operating systems and so forth, memory circuitry 420 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 400 may incorporate the three-dimensional (3D) cross-point (XPOINT) memories from Intel® and Micron®.

Removable memory circuitry 423 may include devices, circuitry, enclosures/housings, ports or receptacles, etc. used to coupled portable data storage devices with the platform 400. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 400 may also include interface circuitry (not shown) that is used to connect external devices with the platform 400. The external devices connected to the platform 400 via the interface circuitry may include sensors 421, such as accelerometers, level sensors, flow sensors, temperature sensors, pressure sensors, barometric pressure sensors, and the like. The interface circuitry may be used to connect the platform 400 to electro-mechanical components (EMCs) 422, which may allow platform 400 to change its state, position, and/or orientation, or move or control a mechanism or system. The EMCs 422 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 400 may be configured to operate one or more EMCs 422 based on one or more captured events and/or instructions or control signals received from a service provider and/or various clients.

In some implementations, the interface circuitry may connect the platform 400 with positioning circuitry 445, which may be the same or similar as the positioning circuitry 345 discussed with regard to FIG. 3.

In some implementations, the interface circuitry may connect the platform 400 with near-field communication (NFC) circuitry 440, which may include an NFC controller coupled with an antenna element and a processing device. The NFC circuitry 440 may be configured to read electronic tags and/or connect with another NFC-enabled device.

The driver circuitry 446 may include software and hardware elements that operate to control particular devices that are embedded in the platform 400, attached to the platform 400, or otherwise communicatively coupled with the platform 400. The driver circuitry 446 may include individual drivers allowing other components of the platform 400 to interact or control various input/output (I/O) devices that may be present within, or connected to, the platform 400. For example, driver circuitry 446 may include a display driver to control and allow access to a display device, a touchscreen driver to control and allow access to a touchscreen interface of the platform 400, sensor drivers to obtain sensor readings of sensors 421 and control and allow access to sensors 421, EMC drivers to obtain actuator positions of the EMCs 422 and/or control and allow access to the EMCs 422, a camera driver to control and allow access to an embedded image capture device, audio drivers to control and allow access to one or more audio devices.

The power management integrated circuitry (PMIC) 425 (also referred to as "power management circuitry 425") may manage power provided to various components of the platform 400. In various embodiments, with respect to the baseband circuitry 410, the PMIC 425 may control power-source selection, voltage scaling, battery charging, or DC-to-DC conversion. The PMIC 425 may often be included when the platform 400 is capable of being powered by a battery 430, for example, when the device is included in a UE 101, 102, 201.

In some embodiments, the PMIC 425 may control, or otherwise be part of, various power saving mechanisms of the platform 400. For example, if the platform 400 is in an RRC_Connected state, where it is still connected to the RAN node as it expects to receive traffic shortly, then it may enter a state known as Discontinuous Reception Mode (DRX) after a period of inactivity. During this state, the platform 400 may power down for brief intervals of time and thus save power. If there is no data traffic activity for an extended period of time, then the platform 400 may transition off to an RRC_Idle state, where it disconnects from the network and does not perform operations such as channel quality feedback, handover, etc. The platform 400 goes into a very low power state and it performs paging where again it periodically wakes up to listen to the network and then powers down again. The platform 400 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 430 may power the platform 400, although in some examples the platform 400 may be mounted deployed in a fixed location, and may have a power supply coupled to an electrical grid. The battery 430 may be a lithium ion battery, a metal-air battery, such as a zinc-air battery, an aluminum-air battery, a lithium-air battery, and the like. In some implementations, such as in V2X applications, the battery 430 may be a typical lead-acid automotive battery.

In some implementations, the battery 430 may be a "smart battery," which includes or is coupled with a Battery Management System (BMS) or battery monitoring integrated circuitry. The BMS may be included in the platform 400 to track the state of charge (SoCh) of the battery 430. The BMS may be used to monitor other parameters of the battery 430 to provide failure predictions, such as the state of health (SoH) and the state of function (SoF) of the battery 430. The BMS may communicate the information of the battery 430 to the application circuitry 405 or other components of the platform 400. The BMS may also include an analog-to-digital (ADC) convertor that allows the application circuitry 405 to directly monitor the voltage of the battery 430 or the current flow from the battery 430. The battery parameters may be used to determine actions that the platform 400 may perform, such as transmission frequency, network operation, sensing frequency, and the like.

A power block, or other power supply coupled to an electrical grid may be coupled with the BMS to charge the battery 430. In some examples, the power block 128 may be replaced with a wireless power receiver to obtain the power wirelessly, for example, through a loop antenna in the computer platform 400. In these examples, a wireless battery charging circuit may be included in the BMS. The specific charging circuits chosen may depend on the size of the battery 430, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 400 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I2C interface, an SPI interface, point to point interfaces, and a power bus, among others.

Figure 5:
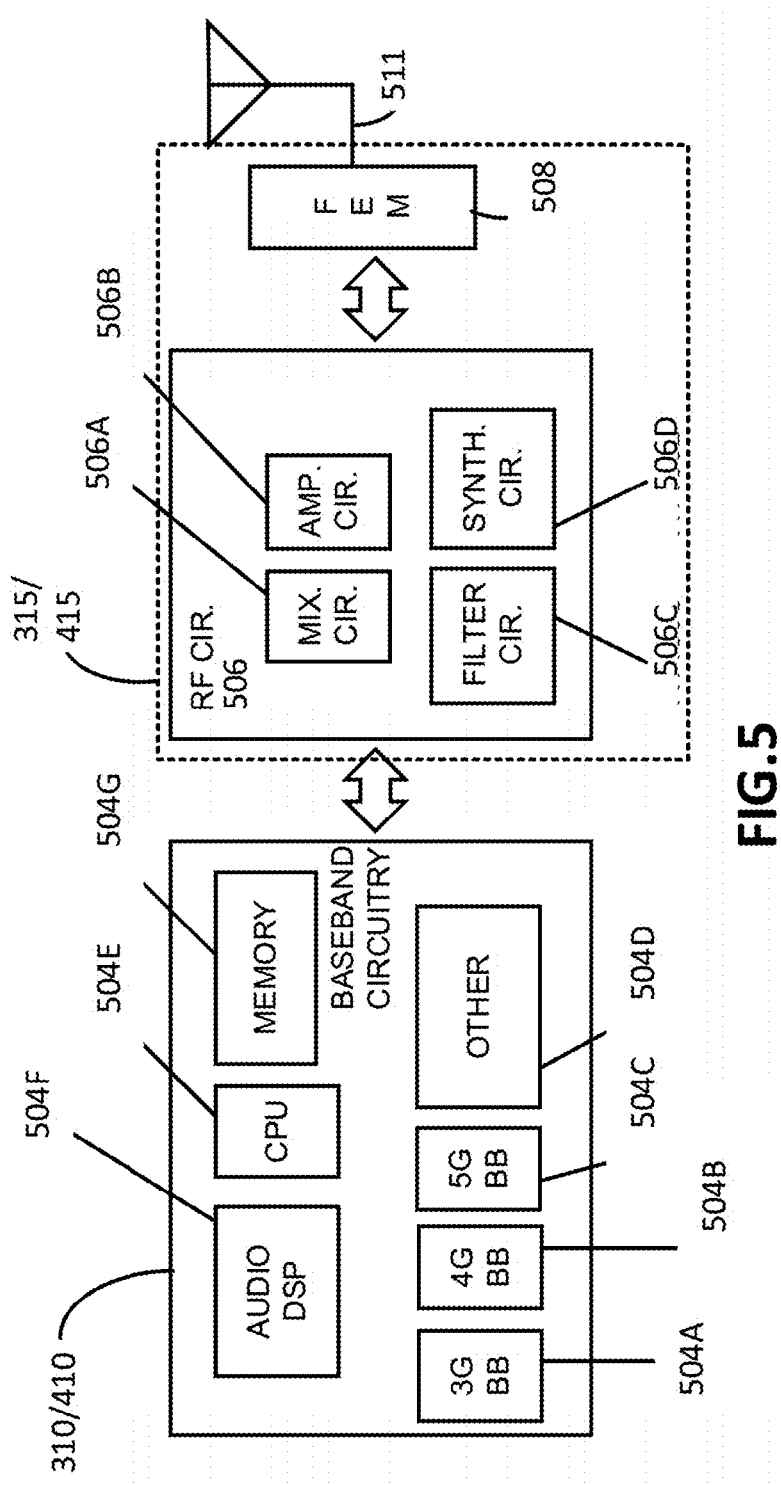
FIG. 5 illustrates example components of baseband circuitry and radio front end modules in accordance with various embodiments.

FIG. 5 illustrates example components of baseband circuitry 310/410 and radio front end modules (RFEM) 315/415 in accordance with some embodiments. As shown, the RFEM 315/415 may include Radio Frequency (RF) circuitry 506, front-end module (FEM) circuitry 508, one or more antennas 511 coupled together at least as shown.

The baseband circuitry 310/410 may include circuitry such as, but not limited to, one or more single-core or multi-core processors. The baseband circuitry 310/410 may include one or more baseband processors or control logic to process baseband signals received from a receive signal path of the RF circuitry 506 and to generate baseband signals for a transmit signal path of the RF circuitry 506. Baseband processing circuitry 310/410 may interface with the application circuitry 305/405 for generation and processing of the baseband signals and for controlling operations of the RF circuitry 506. For example, in some embodiments, the baseband circuitry 310/410 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.). The baseband circuitry 310/410 (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 310/410 may include Fast-Fourier Transform (FFT), precoding, or constellation mapping/demapping functionality. In some embodiments, encoding/decoding circuitry of the baseband circuitry 310/410 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 310/410 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 310/410 and the application circuitry 305/405 may be implemented together such as, for example, on a system on a chip (SoC).

In some embodiments, the baseband circuitry 310/410 may provide for communication compatible with one or more radio technologies. For example, in some embodiments, the baseband circuitry 310/410 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 310/410 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 310/410. RF circuitry 506 may also include a transmit signal path which may include circuitry to up-convert baseband signals provided by the baseband circuitry 310/410 and provide RF output signals to the FEM circuitry 508 for transmission.

In some embodiments, the receive signal path of the RF circuitry 506 may include mixer circuitry 506A, amplifier circuitry 506B and filter circuitry 506C. In some embodiments, the transmit signal path of the RF circuitry 506 may include filter circuitry 506C and mixer circuitry 506A. RF circuitry 506 may also include synthesizer circuitry 506D for synthesizing a frequency for use by the mixer circuitry 506A of the receive signal path and the transmit signal path. In some embodiments, the mixer circuitry 506A of the receive signal path may be configured to down-convert RF signals received from the FEM circuitry 508 based on the synthesized frequency provided by synthesizer circuitry 506D. The amplifier circuitry 506B may be configured to amplify the down-converted signals and the filter circuitry 506C may be a low-pass filter (LPF) or band-pass filter (BPF) configured to remove unwanted signals from the down-converted signals to generate output baseband signals. Output baseband signals may be provided to the baseband circuitry 310/410 for further processing. In some embodiments, the output baseband signals may be zero-frequency baseband signals, although this is not a requirement. In some embodiments, mixer circuitry 506A of the receive signal path may include passive mixers, although the scope of the embodiments is not limited in this respect.

In some embodiments, the mixer circuitry 506A of the transmit signal path may be configured to up-convert input baseband signals based on the synthesized frequency provided by the synthesizer circuitry 506D to generate RF output signals for the FEM circuitry 508. The baseband signals may be provided by the baseband circuitry 310/410 and may be filtered by filter circuitry 506C.

In some embodiments, the mixer circuitry 506A of the receive signal path and the mixer circuitry 506A of the transmit signal path may include two or more mixers and may be arranged for quadrature downconversion and upconversion, respectively. In some embodiments, the mixer circuitry 506A of the receive signal path and the mixer circuitry 506A of the transmit signal path may include two or more mixers and may be arranged for image rejection (e.g., Hartley image rejection). In some embodiments, the mixer circuitry 506A of the receive signal path and the mixer circuitry 506A may be arranged for direct downconversion and direct upconversion, respectively. In some embodiments, the mixer circuitry 506A of the receive signal path and the mixer circuitry 506A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 310/410 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506D may be a fractional-N synthesizer or a fractional N/N+1 synthesizer, although the scope of the embodiments is not limited in this respect as other types of frequency synthesizers may be suitable. For example, synthesizer circuitry 506D may be a delta-sigma synthesizer, a frequency multiplier, or a synthesizer including a phase-locked loop with a frequency divider.

The synthesizer circuitry 506D may be configured to synthesize an output frequency for use by the mixer circuitry 506A of the RF circuitry 506 based on a frequency input and a divider control input. In some embodiments, the synthesizer circuitry 506D may be a fractional N/N+1 synthesizer.

In some embodiments, frequency input may be provided by a voltage controlled oscillator (VCO), although that is not a requirement. Divider control input may be provided by either the baseband circuitry 310/410 or the applications processor 305/405 depending on the desired output frequency. In some embodiments, a divider control input (e.g., N) may be determined from a look-up table based on a channel indicated by the applications processor 305/405.

Synthesizer circuitry 506D of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 511, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 511. In various embodiments, the amplification through the transmit or receive signal paths may be done solely in the RF circuitry 506, solely in the FEM 508, or in both the RF circuitry 506 and the FEM 508.

In some embodiments, the FEM circuitry 508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 511).

Processors of the application circuitry 305/405 and processors of the baseband circuitry 310/410 may be used to execute elements of one or more instances of a protocol stack. For example, processors of the baseband circuitry 310/40, alone or in combination, may be used execute Layer 3, Layer 2, or Layer 1 functionality, while processors of the baseband circuitry 310/410 may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a medium access control (MAC) layer, a radio link control (RLC) layer, and a packet data convergence protocol (PDCP) layer, described in further detail below. As referred to herein, Layer 1 may include a physical (PHY) layer of a UE/RAN node, described in further detail below.

Figure 6:
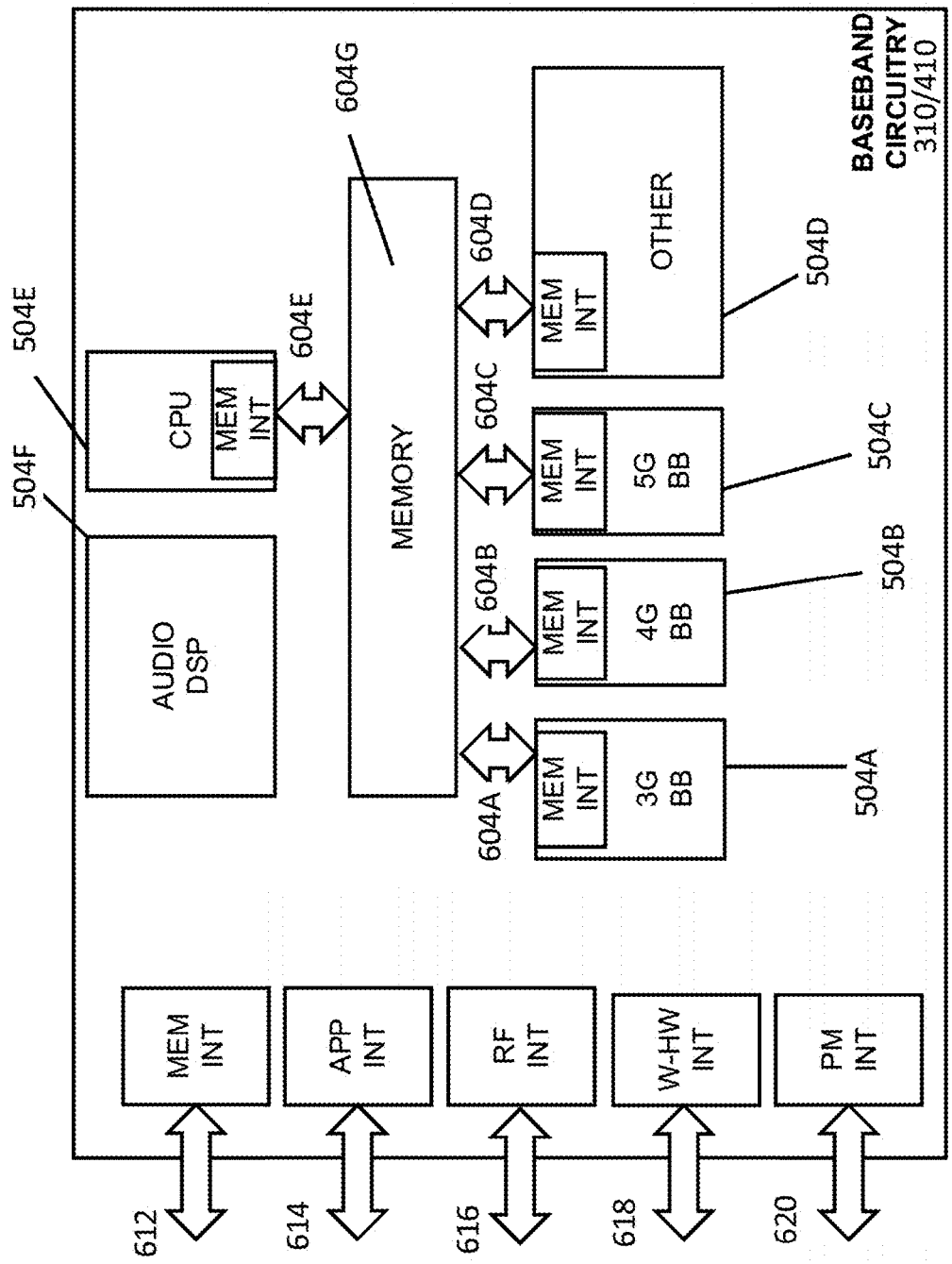
FIG. 6 illustrates example interfaces of baseband circuitry in accordance with various embodiments.

FIG. 6 illustrates example interfaces of baseband circuitry in accordance with some embodiments. As discussed above, the baseband circuitry 310/410 of FIG. 3 to FIG. 4 may include processors 504A-504E and a memory 504G utilized by said processors. Each of the processors 504A-504E may include a memory interface, 604A-604E, respectively, to send/receive data to/from the memory 504G.

The baseband circuitry 310/410 may further include one or more interfaces to communicatively couple to other circuitries/devices, such as a memory interface 612 (e.g., an interface to send/receive data to/from memory external to the baseband circuitry 310/40), an application circuitry interface 614 (e.g., an interface to send/receive data to/from the application circuitry 305/405 of FIG. 3 to FIG. 4), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMIC 55.

Figure 7:
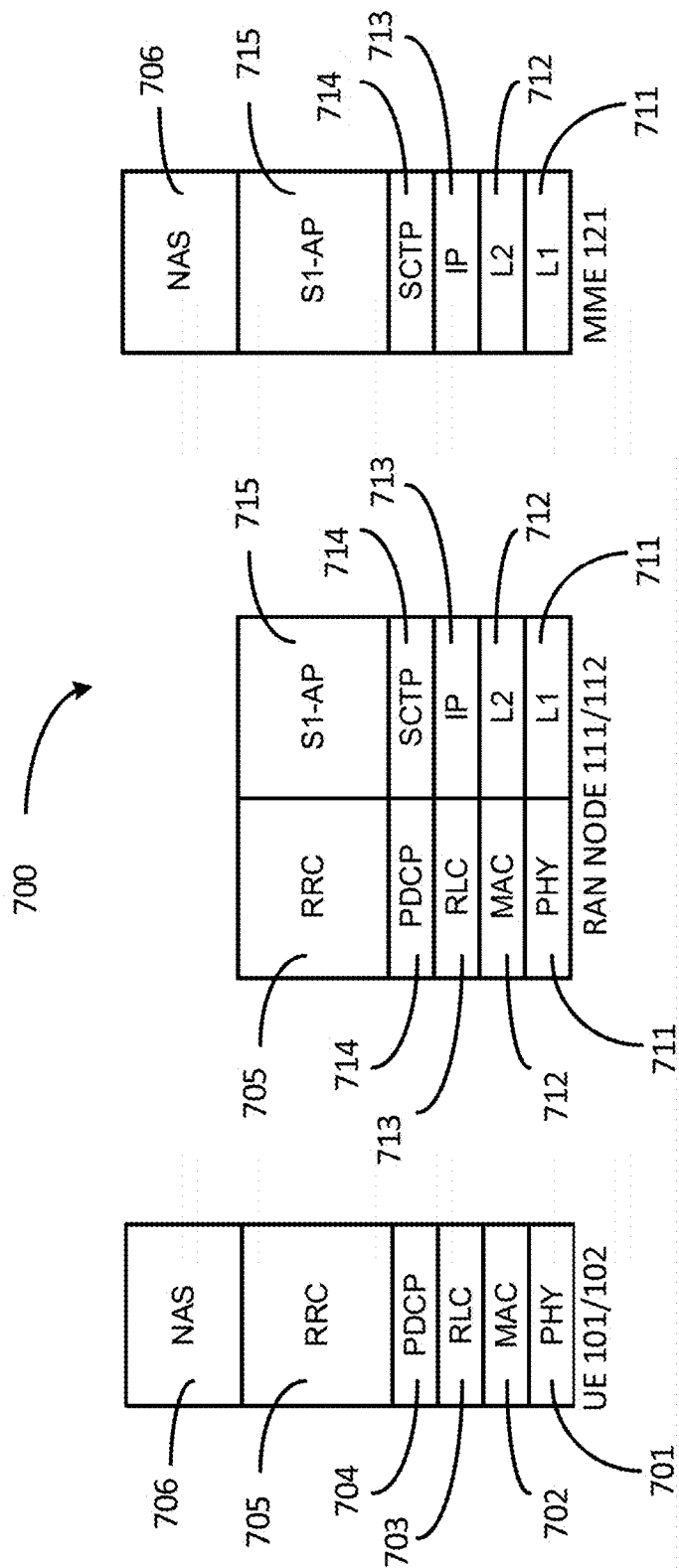
FIG. 7 shows an illustration of a control plane protocol stack in accordance with various embodiments.

FIG. 7 is an illustration of a control plane protocol stack in accordance with some embodiments. In this embodiment, a control plane 700 is shown as a communications protocol stack between the UE 101 (or alternatively, the UE 102), the RAN node 111 (or alternatively, the RAN node 112), and the MME 121.

The PHY layer 701 may transmit or receive information used by the MAC layer 702 over one or more air interfaces. The PHY layer 701 may further perform link adaptation or adaptive modulation and coding (AMC), power control, cell search (e.g., for initial synchronization and handover purposes), and other measurements used by higher layers, such as the RRC layer 705. The PHY layer 701 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 702 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 703 may operate in a plurality of modes of operation, including: Transparent Mode (TM), Unacknowledged Mode (UM), and Acknowledged Mode (AM). The RLC layer 703 may execute transfer of upper layer protocol data units (PDUs), error correction through automatic repeat request (ARQ) for AM data transfers, and concatenation, segmentation and reassembly of RLC SDUs for UM and AM data transfers. The RLC layer 703 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 704 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 705 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may include one or more information elements (IEs), which may each include individual data fields or data structures.

The UE 101 and the RAN node 111 may utilize a Uu interface (e.g., an LTE-Uu interface) to exchange control plane data via a protocol stack including the PHY layer 701, the MAC layer 702, the RLC layer 703, the PDCP layer 704, and the RRC layer 705.

The non-access stratum (NAS) protocols 706 form the highest stratum of the control plane between the UE 101 and the MME 121. The NAS protocols 706 support the mobility of the UE 101 and the session management procedures to establish and maintain IP connectivity between the UE 101 and the P-GW 123.

The S1 Application Protocol (S1-AP) layer 715 may support the functions of the S1 interface and include Elementary Procedures (EPs). An EP is a unit of interaction between the RAN node 111 and the CN 120. The S1-AP layer services may include two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 714 may ensure reliable delivery of signaling messages between the RAN node 111 and the MME 121 based, in part, on the IP protocol, supported by the IP layer 713. The L2 layer 712 and the L1 layer 711 may refer to communication links (e.g., wired or wireless) used by the RAN node and the MME to exchange information.

The RAN node 111 and the MME 121 may utilize an S1-MME interface to exchange control plane data via a protocol stack including the L1 layer 711, the L2 layer 712, the IP layer 713, the SCTP layer 714, and the S1-AP layer 715.

Figure 8:
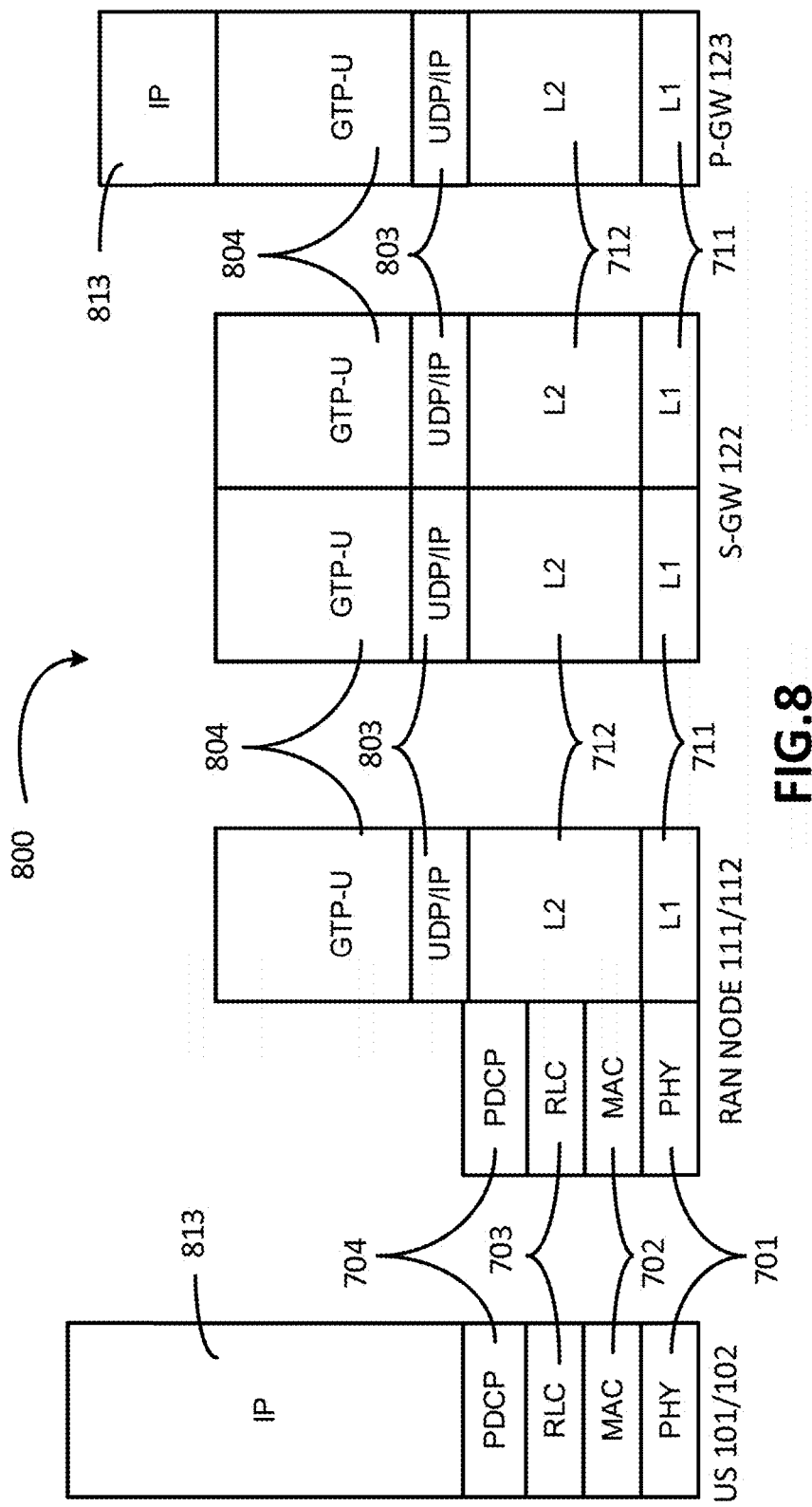
FIG. 8 is an illustration of a user plane protocol stack in accordance with various embodiments.

FIG. 8 is an illustration of a user plane protocol stack in accordance with some embodiments. In this embodiment, a user plane 800 is shown as a communications protocol stack between the UE 101 (or alternatively, the UE 102), the RAN node 111 (or alternatively, the RAN node 112), the S-GW 122, and the P-GW 123. The user plane 800 may utilize at least some of the same protocol layers as the control plane 700. For example, the UE 101 and the RAN node 111 may utilize a Uu interface (e.g., an LTE-Uu interface) to exchange user plane data via a protocol stack including the PHY layer 701, the MAC layer 702, the RLC layer 703, the PDCP layer 704.

The General Packet Radio Service (GPRS) Tunneling Protocol for the user plane (GTP-U) layer 804 may be used for carrying user data within the GPRS core network and between the radio access network and the core network. The user data transported can be packets in any of IPv4, IPv6, or PPP formats, for example. The UDP and IP security (UDP/IP) layer 803 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack including the L1 layer 711, the L2 layer 712, the UDP/IP layer 803, and the GTP-U layer 804. The S-GW 122 and the P-GW 123 may utilize an S5/S8a interface to exchange user plane data via a protocol stack including the L1 layer 711, the L2 layer 712, the UDP/IP layer 803, and the GTP-U layer 804. As discussed above with respect to FIG. 7, NAS protocols support the mobility of the UE 101 and the session management procedures to establish and maintain IP connectivity between the UE 101 and the P-GW 123.

Figure 9:
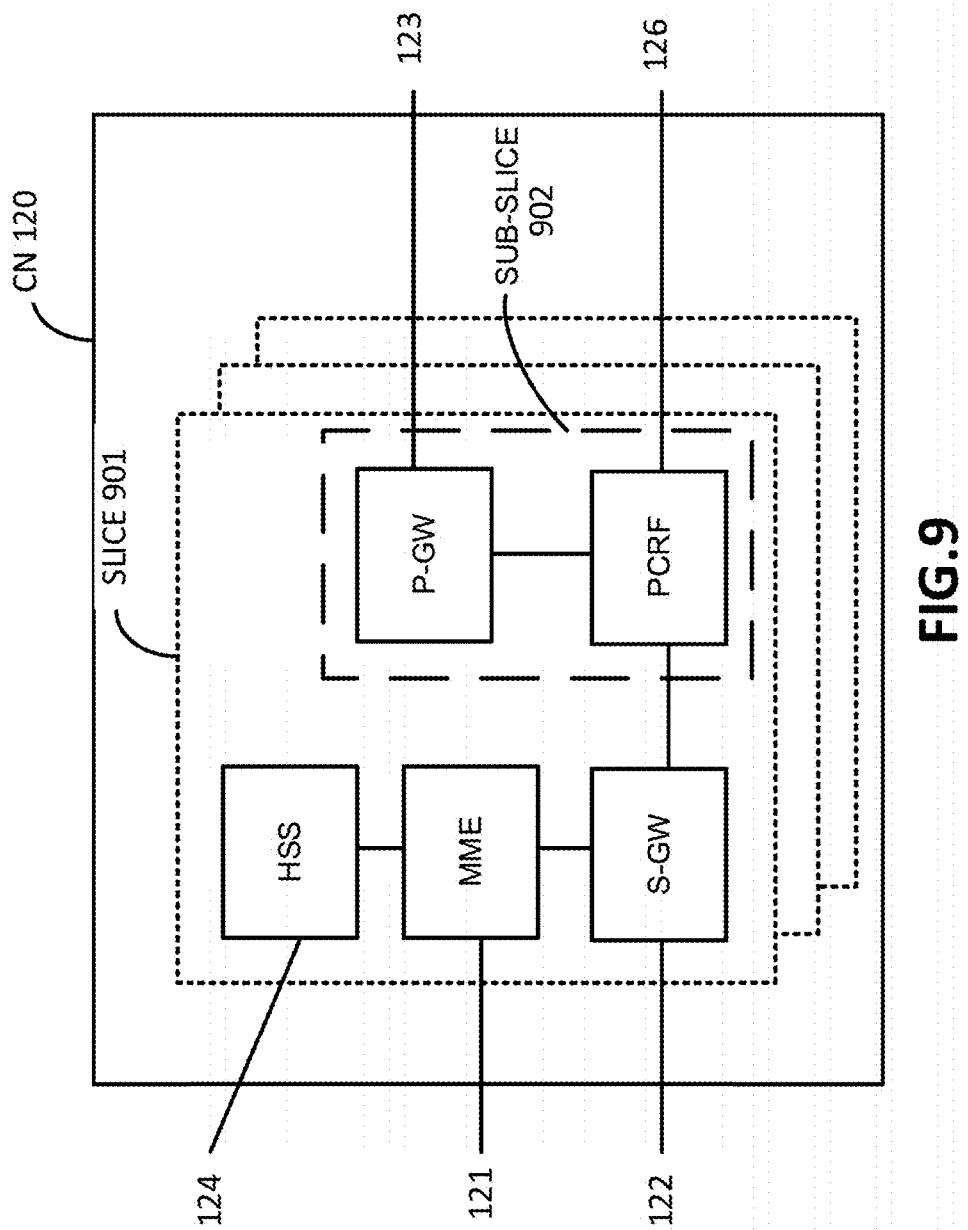
FIG. 9 illustrates components of a core network in accordance with various embodiments.

FIG. 9 illustrates components of a core network in accordance with some embodiments. The components of the CN 120 may be implemented in one physical node or separate physical nodes including components to read and execute instructions from a machine-readable or computer-readable medium (e.g., a non-transitory machine-readable storage medium). In embodiments, the components of CN 220 may be implemented in a same or similar manner as discussed herein with regard to the components of CN 120. In some embodiments, Network Functions Virtualization (NFV) is utilized to virtualize any or all of the above described network node functions via executable instructions stored in one or more computer-readable storage mediums (described in further detail below). A logical instantiation of the CN 120 may be referred to as a network slice 901, and individual logical instantiations of the CN 120 may provide specific network capabilities and network characteristics. A logical instantiation of a portion of the CN 120 may be referred to as a network sub-slice 902 (e.g., the network sub-slice 902 is shown to include the PGW 123 and the PCRF 126).

As used herein, the terms "instantiate", "instantiation", and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to set of network functions (NFs) instances and the resources (e.g., compute, storage, and networking resources) required to deploy the network slice.

With respect to 5G systems (see e.g., FIG. 2), a network slice may include the CN control plane and user plane NFs, NG RANs in a serving PLMN, and a N3IWF functions in the serving PLMN. Individual network slices may have different Single Network Slice Selection Assistance Information (S-NSSAI) and/or may have different Slice/Service Types (SSTs). Network slices may differ for supported features and network functions optimizations, and/or multiple network slice instances may deliver the same service/features but for different groups of UEs (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G access node (AN) and associated with eight different S-NSSAIs. Moreover, an AMF instance serving an individual UE may belong to each of the network slice instances serving that UE.

NFV architectures and infrastructures may be used to virtualize one or more NFs, alternatively performed by proprietary hardware, onto physical resources including a combination of industry-standard server hardware, storage hardware, or switches. In other words, NFV systems can be used to execute virtual or reconfigurable implementations of one or more EPC components/functions.

Figure 10:
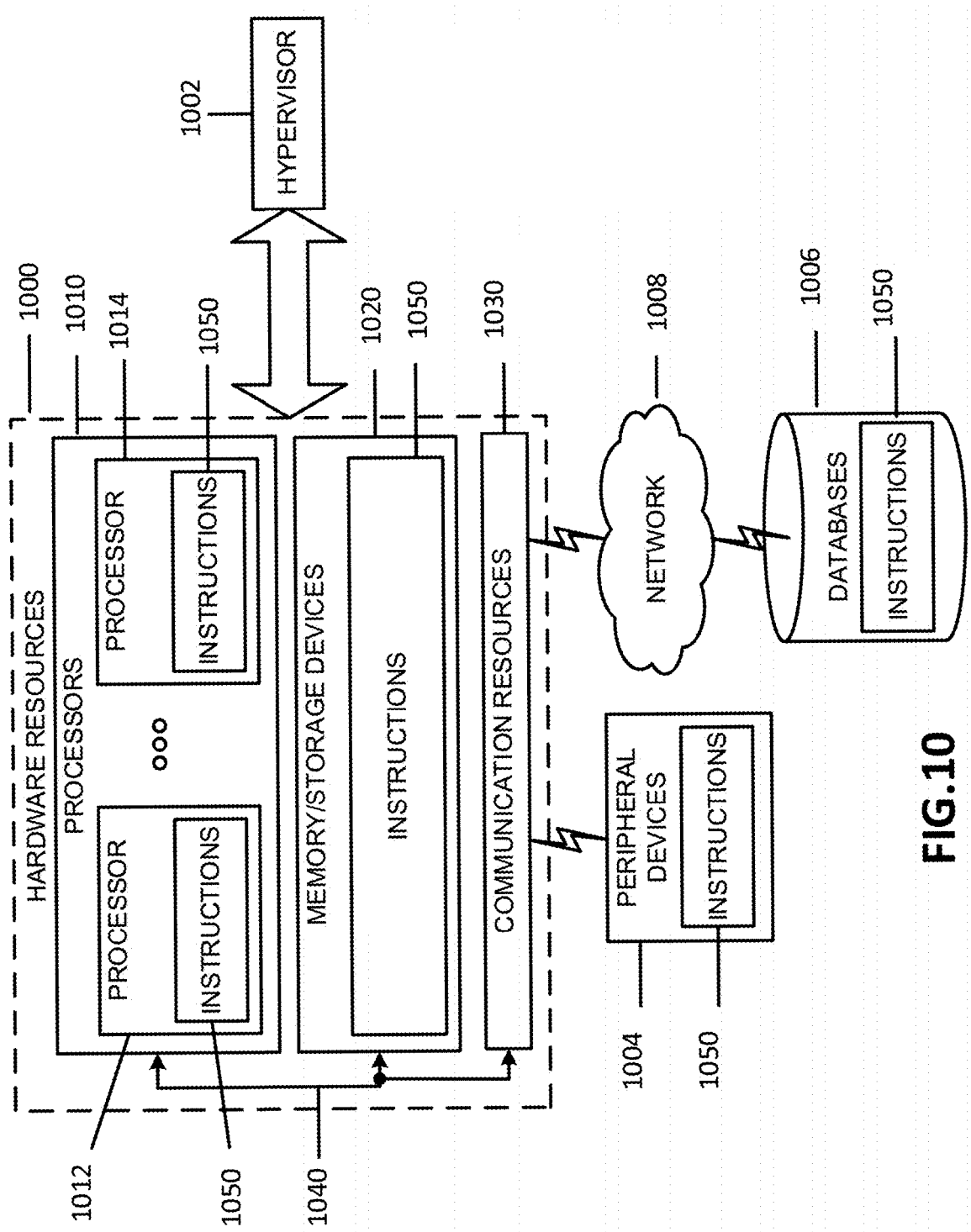
FIG. 10 shows a block diagram illustrating components, according to various embodiments.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. For one embodiment, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1002 may be executed to provide an execution environment for one or more network slices/sub-slices to utilize the hardware resources 1000. A "virtualized resource" may refer to compute, storage, and/or network resources provided by virtualization infrastructure to an application, device, system, etc.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1050 may include software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below in the example section. In another example, circuitry associated with a UE, a base station (e.g., a DN, a gNodeB, etc.), a network element, etc., as described above in connection with one or more of the preceding figures may be configured to operate in accordance with one or more of the examples set forth below in the example section.

Figure 11:
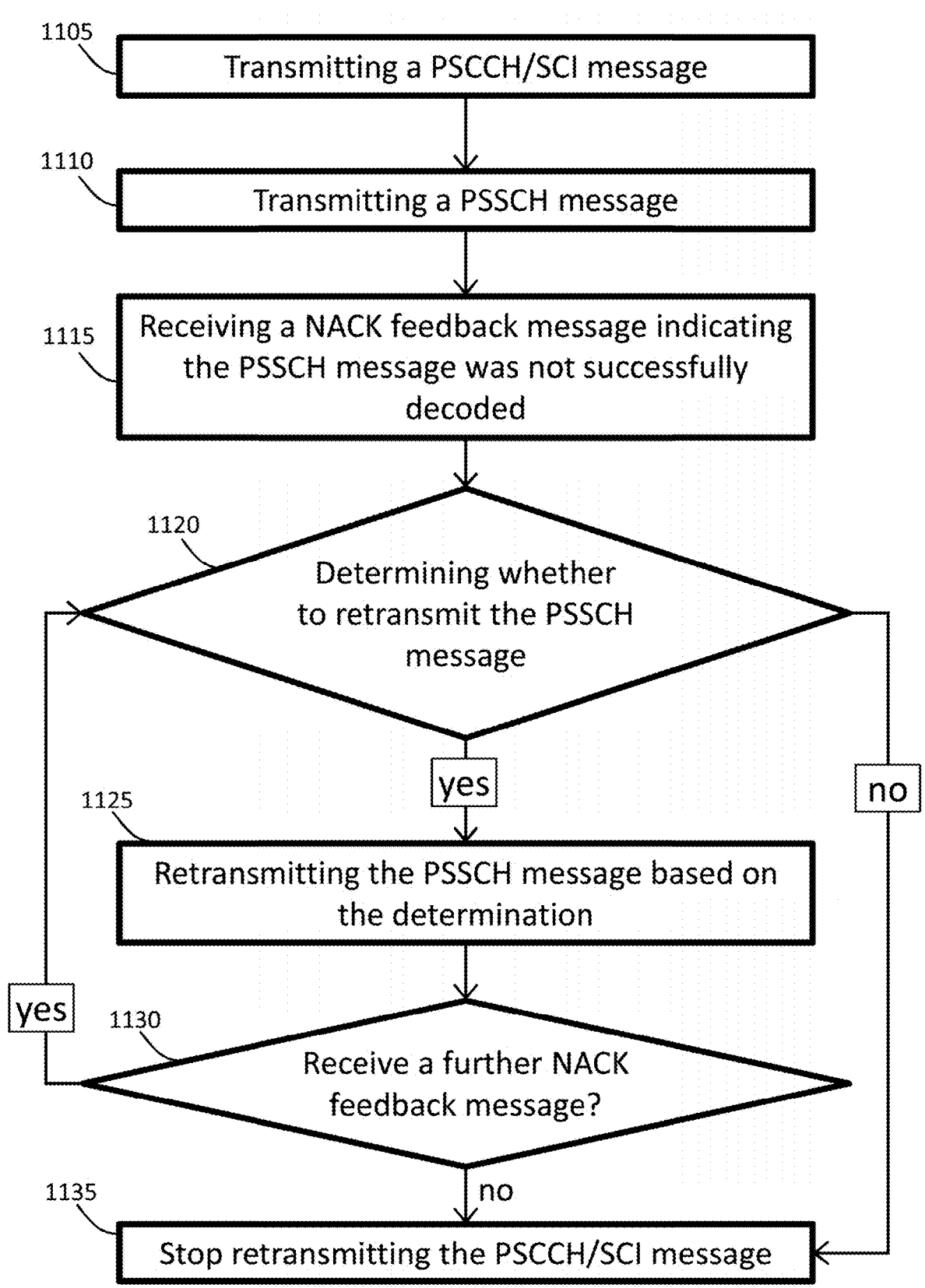
FIG. 11 shows a flow diagram illustrating a method for facilitating hybrid automatic retransmission (HARQ), according to various embodiments.
Figure 12:
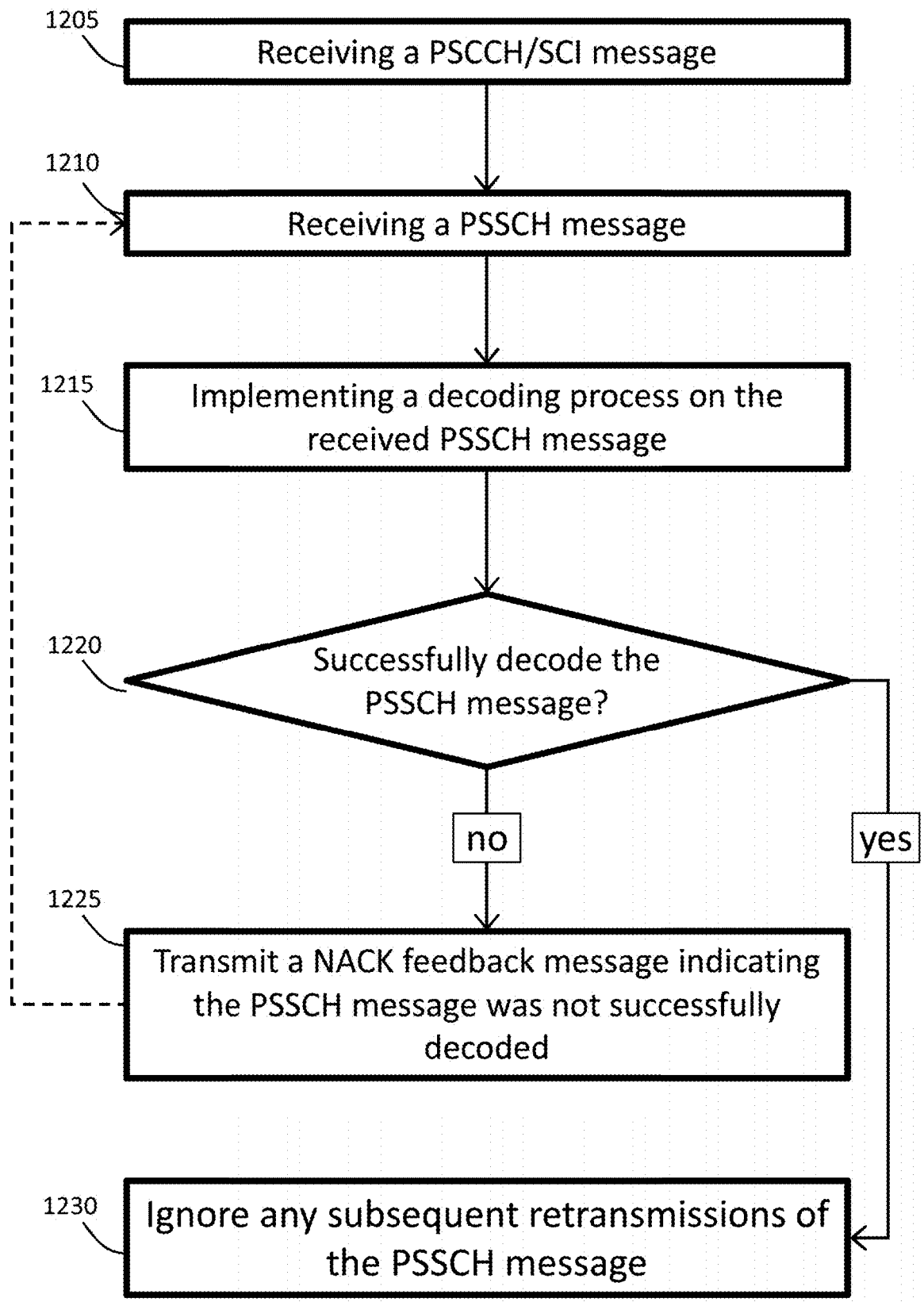
FIG. 12 shows another flow diagram illustrating a method for facilitating HARQ, according to various embodiments.

FIGS. 11 and 12, show according to exemplary embodiments of the present disclosure, methods for facilitating or providing hybrid automatic retransmission (HARQ). These methods or variations thereof, may interact with each other. The exemplary method 1100 of FIG. 11 may be considered from a transmitting perspective while the exemplary method 1200 of FIG. 12 may be considered from a receiving perspective.

Suitable or appropriate mobile radio communication terminals (e.g., user equipments (UEs)) described herein may implement the exemplary methods or variants thereof of FIGS. 11 and 12. For example, the methods or processes of FIGS. 11 and 12 may be performed or executed by mobile radio communication terminals (e.g., UEs as shown in the simplified exemplary system depicted in FIG. 13).

The UEs 1310, 1320, and 1330 may wirelessly communicate, e.g., through any suitable radio technology, including the wireless technologies described herein. For example, the UEs may implement radio access technologies such as New Radio (NR) radio access technologies.

The methods 1100 and 1200 described in connection with FIGS. 11 and 12 show or include feedback based HARQ schemes, such as, for example, for sidelink communications (e.g., NR V2V or V2X communications). FIGS. 11 and 12 may include facilitating, enabling, or providing NACK feedback based HARQ retransmissions for unicast or group-cast communications.

In the exemplary method 1100 of FIG. 11, at 1105, the method includes transmitting a PSCCH/SCI message. For example, UE 1310 of FIG. 13 transmits a PSCCH/SCI message or data, that may be part of a group-cast or unicast communication. The PSCCH/SCI message may be a control message that schedules transmission of data messages, e.g., scheduling and resource allocation information for transmission of PSSCH data and NACK transmission. The PSCCH/SCI message can include information indicating how and when data will be transmitted, e.g., indicating what or which time and frequency resources which are to be used for the transmission of PSSCH messages. The PSCCH/SCI message can include resource allocation information for NACK messages, including time and frequencies domain information, e.g., indicating which time slots, resource blocks, and symbols are to be used for NACK feedback messages. The PSCCH/SCI message may include information indicating a start resource block(s) index for NACK messages as well as information indicating a time interval between NACK message transmission and PSSCH transmission. Further the PSCCH/SCI message may include information indicating a maximum amount or limit as to how many repetitions or retransmissions of the NACK feedback messages may be sent, or the maximum amount of times the NACK feedback message should be resent in response to failed decoding of a particular PSSCH message. The PSCCH/SCI message may also signal or indicate that orthogonal frequency division multiplex (OFDM) symbols to be used for NACK messages.

Figure 13:
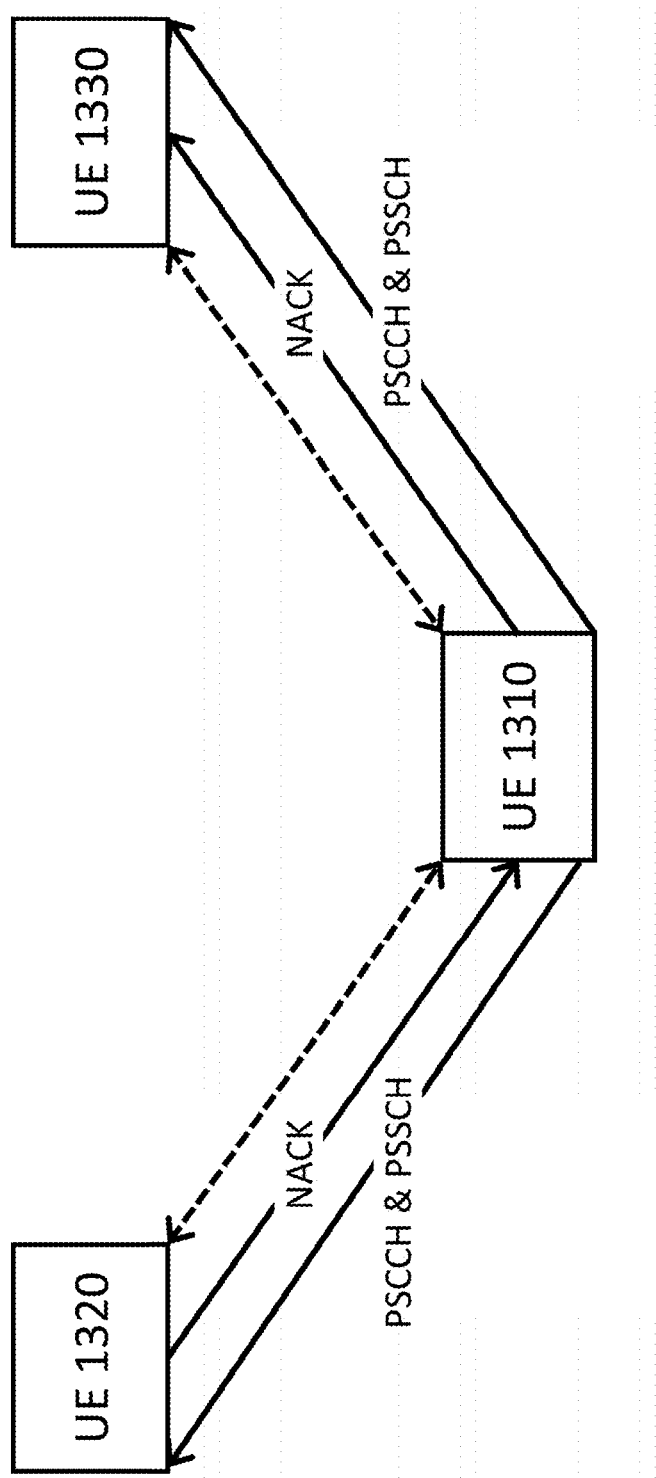
FIG. 13 shows a block diagram illustrating components, according to various embodiments.

At 1110 of FIG. 11, the method further includes transmitting the PSSCH message. Referring to FIG. 13, the UE 1310, configured to implement the method 1100 of FIG. 11, may transmit PSSCH data to one or more other UEs, e.g., UE 1320 and/or UE 1330. The PSSCH message or data may be transmitted as a group-cast or unicast communication, e.g., as a NR V2V group-cast or unicast communication. Further, the PSSCH message may be an initial message or a retransmission. The PSSCH message may be transmitted by the UE 1310 in accordance with the scheduling information of the PSCCH/SCI message. That is, the PSSCH message may be transmitted in a selected channel from a resource pool in accordance with used wireless communication schemes described herein, e.g., V2X communication.

At 1115, the method includes receiving a NACK feedback message. The NACK feedback message indicates that the transmitted PSSCH message was not successfully decoded by a receiving UE, e.g., UE 1320. The NACK feedback message may be sent in accordance with the parameters and scheduling information of the PSCCH/SCI message. For example, the NACK feedback message may be sent using one or more resource blocks (RBs) and may include OFDM symbols.

In one example, the UE 1310, transmitting, e.g., a groupcast transmission, may be configured to wait a set amount of time for receiving the NACK message. If a certain amount of time has elapsed without receiving a NACK message, then the UE 1310 may proceed based on the premise that the receiving UE(s) (e.g., UE 1320 and/or 1330) have received and successfully decoded the PSSCH message.

At 1120, the method 1100 includes determining, in response to receiving the NACK message, whether to retransmit the PSSCH message.

In response to a determination to retransmit, the method 1100 proceeds to 1125, which includes retransmitting the PSSCH message based on the determination. The determination to transmit may be based on one or more criteria, such as the number of transmission or retransmissions of the PSSCH message already sent.

At 1125, retransmitting the PSSCH message, may include retransmitting the PSCCH/SCI message before retransmission of the PSSCH data. The retransmitted PSCCH/SCI message can include the same or similar control and scheduling information as described before, e.g., it can include control and scheduling information for upcoming retransmission the PSSCH message and possible future NACK messages.

In addition, at 1130, the method further includes receiving, after retransmitting the PSSCH message, a further or subsequent NACK message. If a further NACK feedback message is received, then the method returns to the determination at 1125 and proceeds again from there. However, if no further NACK message is received, then the method proceeds to 1135 and retransmission of the PSSCH message is stopped. Similarly, if the determination, at 1125 determination 1120 determines not retransmit (e.g., the UE determines that the maximum number of retransmission has already been reached), then method also proceeds to stop retransmitting the PSSCH message at 1135.

For example, the UE 1310 may determine whether retransmit based on a number of retransmissions of the PSSCH message the UE 1310 has previously sent. (In the case where the PSSCH has not yet resent the PSSCH, the current number of retransmissions is zero.) If the number retransmissions already sent is less than a predefined/predetermined threshold, then the UE 1310 proceeds to retransmit the PSSCH message.

In at least one example, a UE, e.g., UE 1310, receives a single or first NACK feedback message after transmission of a PSSCH message but does not subsequently receive any additional NACK feedback messages after retransmission of the PSSCH message, then the UE 1310 is configured not to further retransmit the PSSCH message.

For retransmission of the PSSCH, UEs, such as UE 1310 configured to implement the method 1100, may use incremental redundancy. That is, retransmissions may include a different set of coded bits than the original transmission. In other cases or examples, or simple repetition of the PSSCCH may be used for retransmission, at least until the threshold limit of retransmissions repetitions has been reached. If the predefined/predetermined threshold is reached, then retransmission of the PSSCH message is stopped.

The exemplary method of FIG. 11, may further include, transmitting a plurality beam-specific reference signals, at one more times. The transmission of the beam-specific reference signals, may occur periodically, at scheduled times, and/or aperiodically. Each beam-specific reference signal may be sent in a particular or distinct direction or have a certain amount of directivity. These beam-specific reference signals may be used for improving retransmission of PSSCH messages. For example, at 1115 of method 1100, the NACK message may be received from a select one of a plurality of NACK resources, wherein the selected or utilized NACK resource indicates one of the plurality of beam-specific reference signals. Then, at 1125, the retransmitting of the PSSCH message may including retransmitting the PSSCH message in a direction or directions associated with the beam-specific reference signal indicated by the NACK message. More specifically, the retransmitted PSSCH message may be beamformed to propagate in the direction indirectly indicated by the NACK message.

For example, the UE 1310 may receive NACK feedback message (e.g., from UE 1320) that is sent using a particular resource. Thus the UE 1310 can determine or identify, based on the particular resource used, which particular beam-specific reference signal to use for as basis for retransmission of PSSCH message. The UE 1310 then can apply beamforming for the retransmission of the PSSCH message in the same or substantially similar direction as in the indicated beam-specific reference signal.

In various embodiments, an initial or previous PSSCH message may be transmitted omni-directionally. However, in response to the NACK feedback message, the retransmission may be beamformed and thus more focused directionally. The beamforming gain from the beamformed transmission may considerably improve the link performance compared to the omni-directional retransmission and simultaneously reduce unnecessary interference to other UEs that have already correctly or successfully received and decoded the initial PSSCH transmission.

In some exemplary embodiments of the present disclosure, the correspondence or association between the NACK resources and the beam-specific reference signals may be known or hard coded in the UEs. In other examples, the method 1100 may include transmitting a PSCCH/SCI message that includes the correspondence between the NACK resources and the beam-specific reference signals.

In exemplary embodiments of the present disclosure, 1125 of method 1100 may include receiving a NACK feedback message including a selected NACK sequence from a plurality of NACK sequences, wherein the selected NACK sequence indicates a beam direction for retransmission. In such cases, the method of FIG. 11 may also include, at 1125, retransmitting the PSSCH message in the beam direction indicated by selected NACK sequence of the NACK feedback message. The selected NACK sequence may indirectly indicate a direction by indicating a particular beam-specific reference signal.

Similarly, the association between NACK sequences and beam directions may be already known, for example, the beam directions and NACK sequences may be hardcoded or stored on UEs 1310, 1320, and 1330. In other related embodiments, the association or correspondence between beam directions and NACK sequences may be included in the PSCCH/SCI message. That is, referring back to 1110, the transmitted PSCCH/SCI message may include association or correspondence between NACK sequences and beam directions.

The NACK sequences may be selected from a plurality of orthogonal NACK sequences. That is, each of the possible NACK sequences may be orthogonal to each other. In one example, each of the plurality of NACK sequences is a cyclic-shift of a mother Zadoff-Chu (ZC) sequence.

In the exemplary method 1200 of FIG. 12, at 1205, the method includes receiving a PSCCH/SCI message. As described in at least one example, the UE 1310 of FIG. 13 may transmit a PSCCH/SCI message or data, which can be received, for example by the UE 1320. The PSCCH/SCI message as well as other elements or features of FIG. 12 elements may be as described in connection with the method 1100 of FIG. 11, mutatis mutandis.

Method 1200, at 1210, includes receiving (or attempting to receive), a PSSCH message. Then, at 1215, the method includes implementing a decoding process for the PSSCH message. The method includes determining, at 1220 whether the PSSCH message was successfully decoded. If at 1220, the PSSCH message was successfully decoded, then the method further includes, at 1230, ignoring any subsequent retransmissions of the PSSCH message. However, the method also includes, at 1225, in response to unsuccessfully decoding the PSSCH message, transmitting a NACK feedback message. The transmitting of the NACK message may be done in accordance with the scheduling or parameter information included in the PSCCH/SCI message, as explained in the context of method 1200 of FIG. 12.

For example, the UE 1320, implementing the method 1200, receives a PSSCH message from UE 1310 after receiving the PSCCH/SCI message. The PSSCH message is sent by the UE 1310 according to the control information of the PSCCH/SCI message. The UE 1320 implements a decoding process on the received PSSCH message. If the decoding is not accomplished, for example the PSSCH message was not received correctly so that the decoding cannot be correctly done, then the UE 1320 transmits a NACK feedback message, e.g., to the transmitting device, UE 1310.

As shown in the method 1200 of FIG. 12, the process steps 1220-1225 may repeat. That is, after transmitting the NACK feedback message at 1225, the method may again include receiving a PSSCH message (e.g., a retransmission of the previous PSSCH message), implementing decoding process of the retransmitted PSSCH message, and proceeding again to 1220.

If the decoding is successful, then the method 1200 will proceed to 1230 and ignore any subsequent retransmission of the PSSCH message. Further, if the decoding is successful, no ACK messages are transmitted. With respect to at least method 1200, no ACK messages are transmitted, or at least no ACK messages are transmitted in response to correctly decoding a PSSCH message.

The decoding processes used for method 1200 may be able to use previous submitted PSSCH messages. That is, the decoding process may use the current or just received PSSCH message with one or more previously received PSSCH message. The of use of current (retransmitted) and previous PSSCH messages may improve the chance for successful decoding of the PSSCH message. For example, decoding may done by performing chase combining or incremental redundancy decoding by virtue of retransmission(s) with previous or initial transmission(s).

In some exemplary embodiments of the present disclosure, at 1225, the transmitting of the NACK feedback message may not occur if the number NACK feedback message repetitions or retransmissions has reached a certain number/threshold. In other words, transmitting the NACK feedback message may occur only if the number of times the NACK feedback message has already been sent in response to a particular PSSCH message is less than the repetition/retransmission threshold. The threshold may be standard or already known or "hardcoded" with the UEs, e.g., UE 1320, 1330 of FIG. 13. That is the threshold may be predefined (e.g., by human input) or predetermined (e.g. by computerized/automatic process).

In other exemplary embodiments of the present disclosure, the threshold of NACK feedback message transmissions may be indicated in the PSCCH/SCI message. For example, the UE 1310 can transmits a PSCCH/SCI message to UEs 1320 and 1130 including or indicating the threshold.

Further, the method 1200 may include link adaption for the NACK messages. That is, a UE device (e.g., UE 1320) implementing the method 1200 may on its own determine that actual maximum number of repetitions to be used for NACK transmissions. This number may be lower than the specified or standard maximum number of NACK transmissions. For example, this actual maximum number of repetitions may be calculated by determining pathloss estimation for the received PSCCH or PSSCH messages.

Similar to the method 1100 of FIG. 11, the method 1200 of FIG. 12 may include receiving, at one or more times a plurality of beam-specific reference signals. For example, as previous described, the UE 1310 of FIG. 13 may transmit a plurality of beam-specific reference signals at one or more times (periodically or aperiodically). As such, the UEs 1320 and 1330 may receive a plurality of beam-specific reference signals (from the UE 1310) at one or more times.

Further, the method 1200 transmitting the NACK feedback message may include selecting a NACK resource and then transmitting the NACK feedback message using the selected NACK resource. In further exemplary embodiments of the present disclosure, the selected NACK resource is associated with one of the plurality of beam-specific reference signal. That is, each of the NACK resources is respectively associated with one of the plurality of beam-specific reference signals. For example, the method 1200 may include not only receiving the plurality of beam-specific reference signals at one or more times, but also measure the signal characteristics, such as the Reference Signal Received Power (RSRP) of the plurality of beam-specific reference signals. Thus, the method 1200 may include selecting the NACK resource that is associated or corresponding to the beam-specific reference signal with the best signal characteristic(s), e.g., the best RSRP. As described in connection with FIG. 11, in the method 1200 the PSCCH/SCI message includes NACK resource allocation information indicating the association or correspondence between NACK resources and beam-specific reference signals.

In various examples, the plurality of NACK resources may be known. In one example, the UE 1320 of FIG. 13, before transmitting a NACK feedback message, may selects a NACK resource from a plurality known NACK resources. That is, the knowledge of the plurality NACK resources may already be standardized and known by the UE 1320, e.g., the information is already stored or accessible to the UE 1320. Further, the UE 1320, implementing the method 1200 of FIG. 12, may select a NACK resource corresponding to the beam-specific reference signal that had the best characteristic, e.g., based on the RSRP, and transmit the NACK feedback message using the selected NACK resource.

In various exemplary embodiments of the present disclosure, the method 1200 may include transmitting the NACK feedback message including a NACK sequence. Further, the method 1200 may include selecting the particular NACK sequence from a plurality of NACK sequences, in which the selected NACK sequence indicates a beam direction for retransmission of the PSSCH message. In other words, each NACK sequence may correspond to a beam direction, and the NACK sequence may again be selected on the basis of the beam direction of the RSRPs of the beam-specific reference signals. As described before, the correspondence between NACK sequences and beam directions may be included in NACK resource allocation information of the PSCCH/SCI message. Further, also as described in connection with method 1200, the NACK sequences may be set of orthogonal sequences, and in one example, each NACK sequence being a different cyclic shift of a mother ZC sequence (zero shifted).

Figure 14:
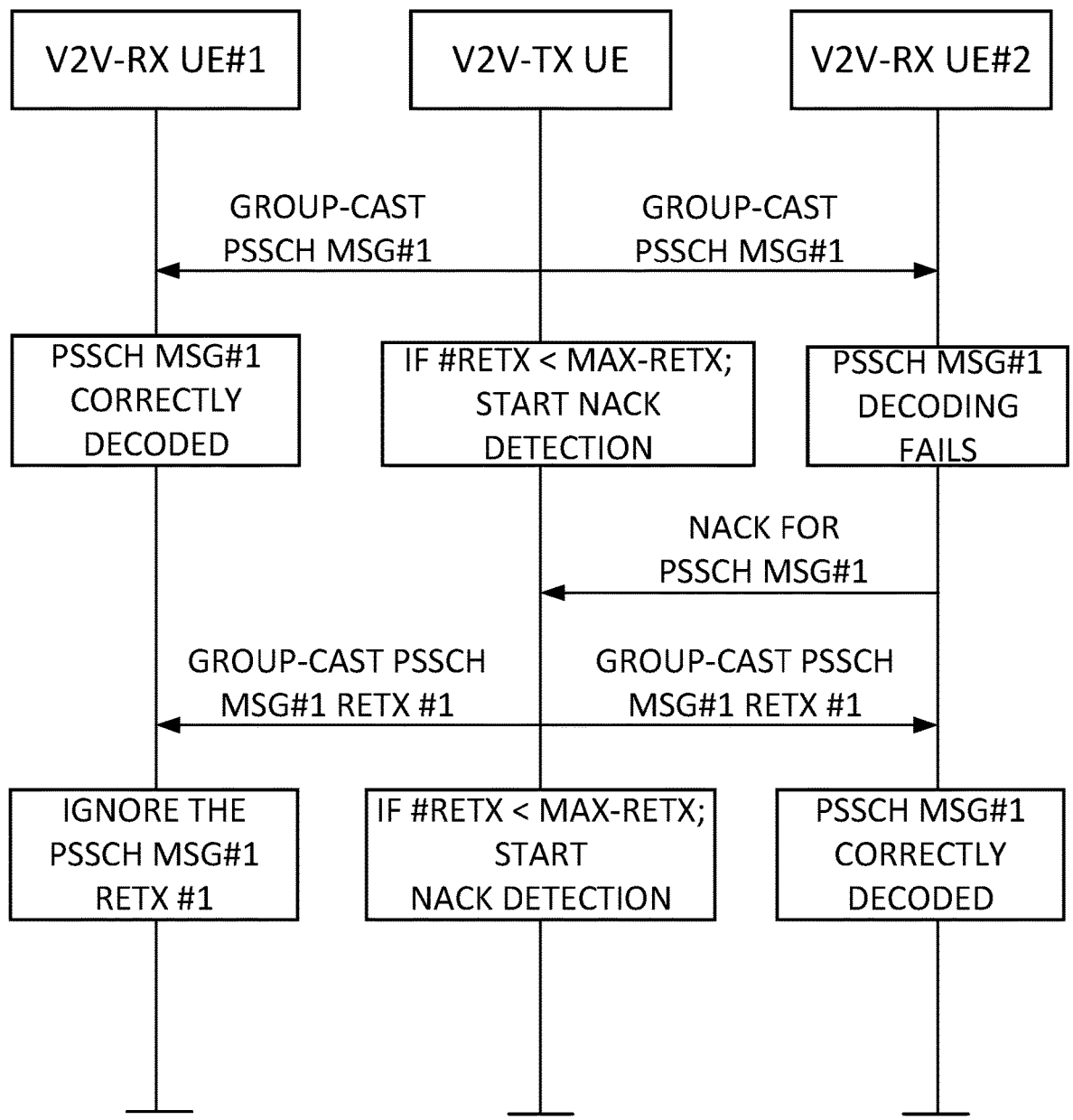
FIG. 14 shows a block and flow diagram, according to various embodiments.

FIG. 14, shows according to at least one exemplary embodiment, a diagram shown one exemplary implementation of methods FIGS. 11 and 12. For example, In the example of FIG. 14, the V2V-TX UE transmits a group-cast PSSCH data, e.g., PSSCH message 1 (Msg #1) as shown. Prior to this transmission, the V2V-TX UE transmits a PCCH data/message signaling or indicating the NACK feedback time-frequency resource allocation. That is, Msg #1 may be transmitted and received in a selected channel in the configured V2X PSSCH resource pool.

As shown in FIG. 14, the V2V-RX UE #1 correctly decodes the Msg #1 while the V2V-RX UE #2 fails to decode the Msg #1. That is the decoding process by V2V-RX UE #1 on the received Msg #1 is successful while the decoding process by V2V-RX UE #2 on the received Msg #1 is unsuccessful. In response to the unsuccessful decoding, the V2V-RX #2 transmit a NACK feedback message ("NACK for PSSCH Msg #1"), including NACK sequence and using the NACK time-frequency resource signaled in the PSCCH message.

In response to successful decoding, the V2V-RX #1 may not transmit an acknowledge or an ACK message to confirm the PSSCH Msg #1" was successfully decoded.

In response to receiving the NACK feedback message the V2V-TX UE retransmits the group-cast Msg #1. In various examples, the retransmission of the previously sent PSSCH message/transport block by the V2V-TX UE can be conducted or implemented using incremental redundancy (IR) retransmission or simple repetition. Further, the V2V-TX UE may transmit, prior to the retransmission of the PSSCH Msg #1, another or PSCCH/SCI message.

The V2V-RX #1, which correctly decoded the PSSCH Msg #1 ignores the retransmission PSSCH Msg #1 ReTX #1, whereas the V2V-RX #2, which did not successfully decode PSSCH Msg #1, implements the decoding process on retransmission PSSCH Msg #1 ReTX #1. In the example of FIG. 14, the V2V-RX #2 successfully decodes the retransmission PSSCH Msg #1 ReTX #1.

The V2V-RX UE #2 in FIG. 14, can perform chase combining or incremental redundancy decoding by virtue of retransmission(s) together with previous transmission. If the V2V-RX UE #2 fails to decode the retransmitted PSSCH, PSSCH Msg #1 ReTX #1, then the process or procedure may repeat after the V2V-TX UE receiving a subsequent NACK feedback message (NACK for PSSCH Msg #1 ReTX #1) sent by the V2V-RX UE #2. As described herein, the amount of retransmissions of the PSSCH message and the NACK feedback message may limited. For example, it may be standardized how many times the V2V-TX UE retransmits the PSSCH message as well as standardized how many times the V2V-RX UE sends a NACK feedback message.

Figure 15:
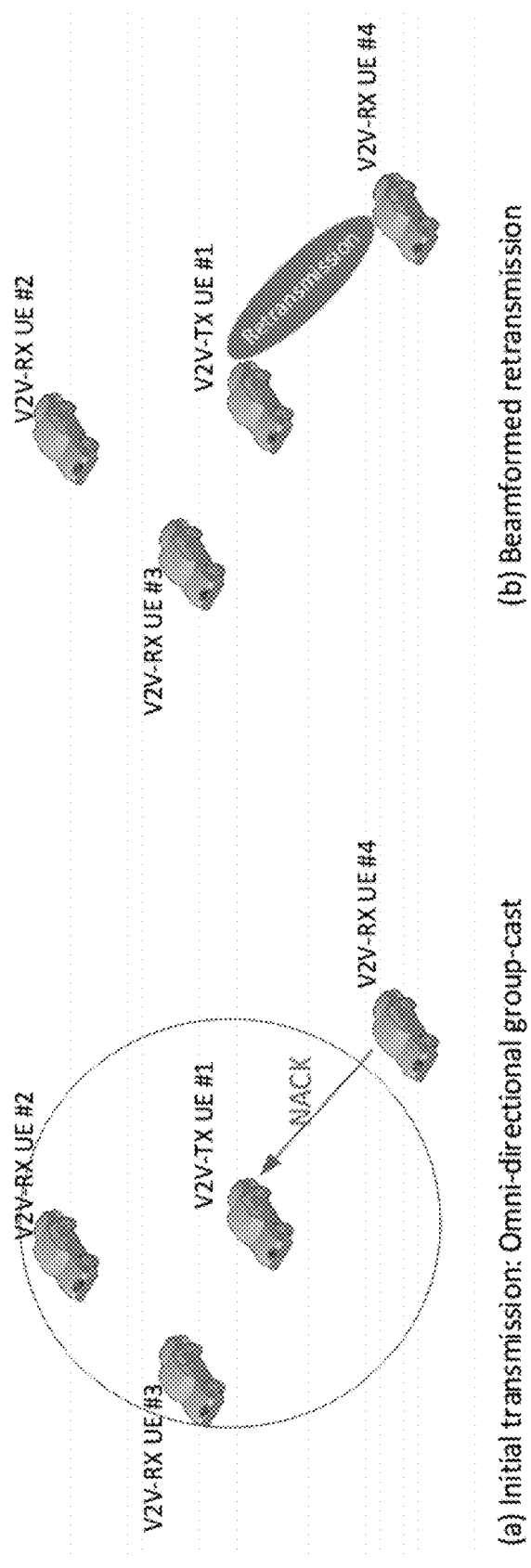
FIGS. 15A and 15B illustrate components, according to various embodiments.

As described in exemplary embodiments herein, the retransmission(s) of the PSSCH messages may be beam-formed retransmission(s). In the example of FIG. 14, the NACK message (NACK for PSSCH Msg #1) sent by V2V-RX UE #2 may, as described in various embodiments herein, may indicate a direction for retransmission of the PSSCH message. That is, the NACK message may directly or indirectly indicate a beam direction by virtue of the NACK resource the V2V-RX UE #2 uses to send the NACK message and/or by virtue of the contents of the message, e.g., by virtue of a sequence included in the NACK message. Accordingly, based on the NACK message, the V2V-TX UE retransmits the PSSCH in the indicated direction. This process can be seen visually in FIGS. 15A and 15B. For example, a previous or initial message sent, PSSCH Msg #1, may be an omni-directional transmission as shown in FIG. 15A. Then, after the V2V-TX UE receives the NACK message, the V2V-TX UE retransmits the PSSCH message more focused directionally, through beam-forming, to the V2V-RX UE #2, as seen in FIG. 15B.

Figure 16:
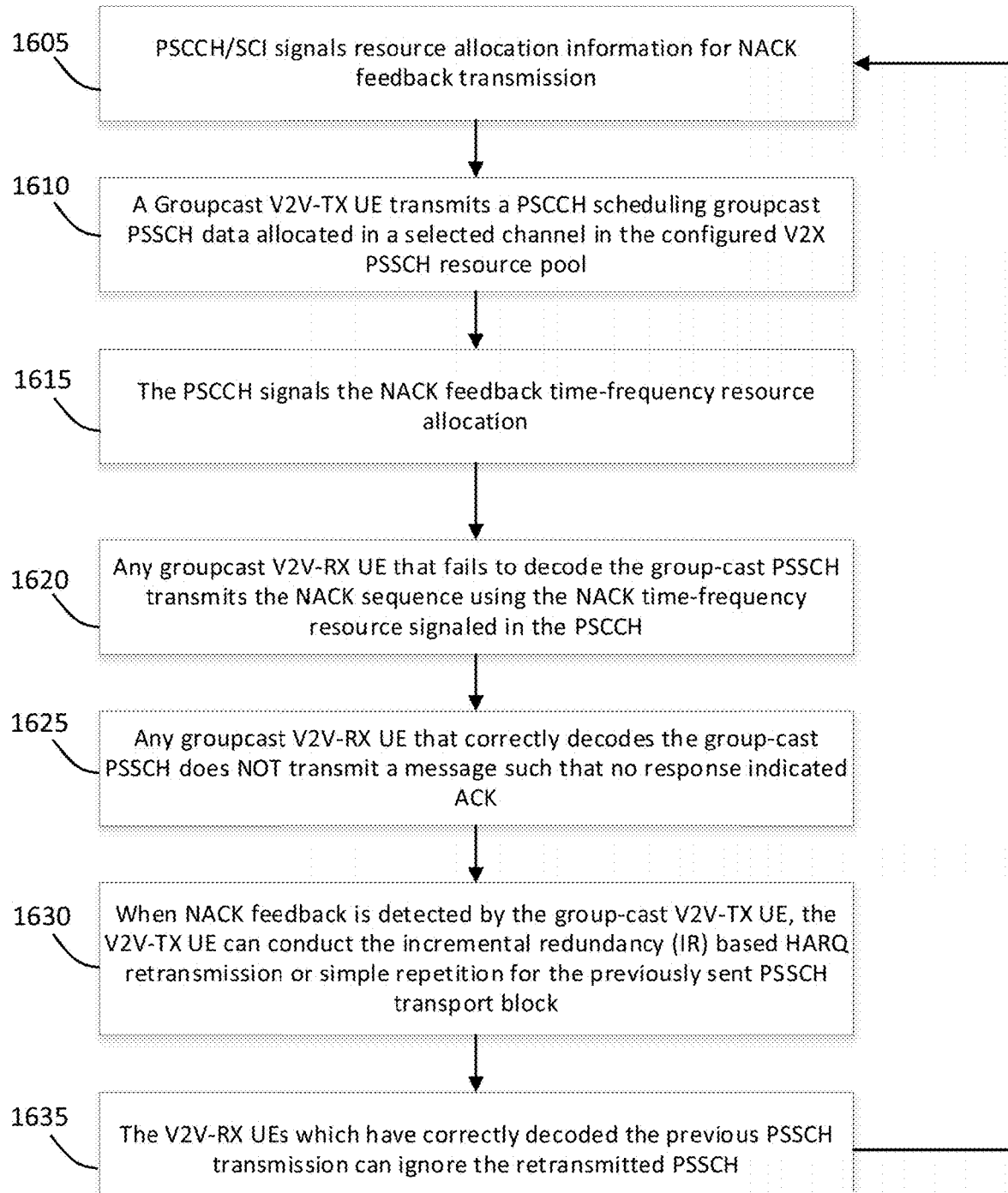
FIG. 16 shows a flow diagram illustrating a method for facilitating hybrid automatic retransmission (HARQ), according to various embodiments.

FIG. 16 is a flow diagram illustrating a method for hybrid automatic retransmission (HARQ), according to various embodiments.

In various embodiments, a method for NACK feedback based HARQ transmission includes as shown at least in part in FIG. 14, may include:

PSCCH/SCI signals the resource allocation information for the NACK feedback transmission. Group-cast V2V-TX UE transmits a PSCCH scheduling group-cast PSSCH data, e.g., PSSCH Msg #1 shown in FIG. 14, allocated in a selected channel in the configured V2X PSSCH resource pool. The PSCCH can signal the NACK feedback time-frequency resource allocation. Those group-cast V2V-RX UE which fail to decode the group-cast PSSCH, e.g. V2V-RX UE #2 in FIG. 14, can transmit the NACK sequence using the NACK time-frequency resource signaled in the PSCCH. Those group-cast V2V-RX UEs, which correctly decode the PSSCH, e.g., V2V-RX UE #1 shown in FIG. 1, do not necessarily transmit positive feedback so that no response effectively indicates the ACK. When NACK feedback is detected by the group-cast V2V-TX UE, the V2V-TX UE can conduct the incremental redundancy (IR) based HARQ retransmission or simple repetition, e.g., the "group-cast PSSCH Msg #1 ReTx #1" shown in FIG. 1, for the previously sent PSSCH transport block. The NACK feedback resource is also signaled in the PSCCH scheduling the retransmission. The V2V-RX UEs which have correctly decoded the previous PSSCH transmission, e.g., V2V-RX UE #1 in FIG. 1, can ignore the retransmitted PSSCH. The V2V-RX UEs which failed the decoding of previous PSSCH transmissions, e.g., V2V-RX UE #2 in FIG. 1, can perform chase combining or incremental redundancy decoding by virtue of retransmissions together with previous transmission. The procedure or process in the above examples can be repeated until either no NACK is detected by the V2V-TX UE or the maximum number of retransmissions is reached.

In various embodiments of the present disclosure, the NACK basic sequence can contain a number of OFDM symbols and RBs. And the basic NACK sequence can be fixed in the standard, and in at least one embodiment, the NACK basic sequence can also be configured by RRC signaling. In various embodiments of the present disclosure, to support the different coverages of NACK transmission, different NACK formats in terms of number of basic NACK sequence repetitions can be also standardized. The SCI can signal the maximum number of repetitions of NACK feedback which can be transmitted by receiving radio mobile communication terminals (e.g., V2V-RX UEs).

Based on pathloss estimation of received PSCCH/PSSCH, receiving radio mobile communication terminals (e.g., V2V-RX UEs) can determine the actual number of repetitions to be used for NACK transmission in case of erroneous reception of PSSCH In various embodiments of the present disclosure, the following information can be included in the NACK feedback resource allocation field of SCI/PSCCH:

- The start RB index of feedback resource in the channel. In at least one embodiment, the NACK feedback resource can be fixed in standard, e.g., always transmitted from the starting RB of the scheduled PSSCH channel. In such cases, the starting RB for NACK feedback resource may be omitted.
- Time interval in terms of number slots between the NACK feedback and the scheduled PSSCH transmission.
- The maximum number of repetitions for NACK feedback transmissions.
- Sequence(s): in one embodiment, the NACK sequence can be UE-specific, e.g., initialized by UE-ID of V2V-TX UE. In at least one other embodiment, the sequence can be time-frequency resource-specific, e.g., being initialized by symbol and resource block index of transmitted PSSCH within the pool.
- Cyclic shift(s): cyclic-shift for the NACK sequence when ZC-sequence is used for NACK sequence.

Further, in various embodiments of the present disclosure, beamforming may be applied. For example, as shown in FIG. 15A, omni-directional transmission can be employed by a transmitting mobile radio communication terminal (e.g., V2V-TX UE), for the initial transmission of wireless message) (e.g., group-cast V2V communication). To enhance the reliability of retransmission, the transmitting mobile radio communication terminal (e.g., V2V-TX UE) can also apply a beamformed retransmission as illustrated in FIG. 15B. The transmitting mobile radio communication terminal (e.g., V2V-TX UE) can transmit several periodic/aperiodic beam-specific reference signals, e.g. NR CSI-RS or SRS, each of which can apply a specific beamforming. Receiving mobile radio communication terminals (e.g., V2V-RX UEs) can determine the preferred transmit beam direction based on the RSRP of the received beam-specific RS. To perform beamformed retransmission, NACK feedback from receiving mobile radio communication terminals (e.g., V2V-RX UEs) can also indicate the preferred transmit beam direction/index for the retransmission.

NACK resource allocation signaling in SCI can include several NACK resource allocations, each of which is associated with a beam-specific RS.

Different NACK resources can be allocated in FDM or TDM manner depending on the beamforming architecture of V2V-TX UEs. Specifically, if the V2V-TX is capable of transmitting/receiving multiple beams simultaneously, NACK resources associated with different beams can be allocated in FDM manner, otherwise, TDM based NACK resource allocation can be used.

V2V-RX UE sending NACK feedback can determine a preferred beam direction for the retransmission, and choose the respective NACK resource associated with the preferred beam direction for the NACK transmission.

Upon reception of the NACK feedback corresponding to a particular beam direction, the V2V-TX UE can employ the implicitly signaled beam direction for the retransmission.

Different orthogonal NACK sequences which can be generated by using different cyclic-shifts of a mother ZC sequence can be associated with different beam directions.

The NACK resource allocation information in SCI can include the correspondence relationships between NACK sequence and beam directions. Thus the beam specific NACK sequence information is signaled in SCI.

The time-frequency resources for NACK feedback can be same or different beam-specific NACK sequences.

The V2V-TX UE can detect the NACK sequences in the signaled NACK time-frequency resources. When a particular NACK sequence is detected, the corresponding beam direction shall be applied by V2V-TX UE for retransmission.

The following examples pertain to further exemplary implementations.

Example 1 is a mobile radio communication terminal device, including at least one receiver, at least one transmitter, and one or more processors operatively coupled to a memory and configured to cause the mobile radio communication terminal device to: transmit, via the at least one transmitter, a physical signal shared channel (PSSCH) message, receive, via the at least one receiver, a non-acknowledgment (NACK) feedback message indicating the PSSCH message was not successfully decoded, and determine whether or not to retransmit the PSSCH message in response to receiving the NACK feedback message, and retransmit, via the at least one receiver, the PSSCH message if the mobile radio communication terminal device determines to retransmit the PSSCH message, and not retransmit the PSSCH message if the mobile radio communication terminal device determines not to retransmit the PSSCH message.

In Example 2, the mobile radio communication terminal device of Example 1, wherein determine whether or not to retransmit the PSSCH message comprises: determine a number of retransmissions of the PSSCH message by the mobile radio communication terminal device is less than a threshold; and determine to retransmit the PSSCH message based on said determination that the number of retransmissions is less than the threshold.

In Example 3, the mobile radio communication terminal device of Example 2, wherein the mobile radio communication terminal device is to determine not to retransmit the PSSCH message by determining whether the current number of retransmissions of the PSSCH message is equal to the threshold.

In Example 4, the mobile radio communication terminal device of any of Examples 1 to 3, wherein the mobile radio communication terminal device is to receive a subsequent NACK message after retransmitting the PSSCH message.

In Example 5, the mobile radio communication terminal device of any of Examples 1 to 4, wherein the one or more processors are further to cause the mobile radio communication terminal device to transmit a physical sidelink control channel/signal control information (PSCCH/SCI) message before transmission of the PSSCH message.

In Example 6, the mobile radio communication terminal device of Example 5, wherein the PSCCH/SCI message includes NACK feedback resource allocation information.

In Example 7, the mobile radio communication terminal device of Example 6, wherein the NACK feedback resource allocation information of the transmitted PSCCH/SCI message includes a start resource block (RB) index for the NACK feedback message.

In Example 8, the mobile radio communication terminal device of Example 6 or 7, wherein the NACK feedback resource allocation information of the transmitted PSCCH/SCI message includes information indicating a time interval between the NACK feedback message and scheduled PSSCH transmission.

In Example 9, the mobile radio communication terminal device of any of Examples 6 to 8, wherein the one or more processors are further to cause the mobile radio communication terminal device to transmit, at one or more times, a plurality of beam-specific reference signals.

In Example 10, the mobile radio communication terminal device of Example 9, wherein the one or more processors are further to cause the mobile radio communication terminal device to receive a NACK feedback message from a selected NACK resource from one of a plurality of NACK resource allocations, wherein the selected NACK resource is to indicate one of the plurality of beam-specific reference signals.

In Example 11, the mobile radio communication terminal device of Example 10, wherein the one or more processors are further to cause the mobile radio communication terminal device to retransmit the PSSCH message in a beam direction of the beam-specific reference signal associated with the selected NACK resource used for the NACK feedback message.

In Example 12, the mobile radio communication terminal device of Example 10, wherein the NACK feedback resource information indicates the plurality of NACK resource allocations and the respective beam-specific reference signal associated with each of the NACK resource allocations.

In Example 13, the mobile radio communication terminal device of any of Examples 9 to 12, wherein the one or more processors are further to cause the mobile radio communication terminal device to receive the NACK feedback message including a selected NACK sequence from a plurality NACK sequences, wherein the selected NACK sequence indicates a beam direction for retransmission of the PSSCH message.

In Example 14, the mobile radio communication terminal device of Example 13, wherein the one or more processors are further to cause the mobile radio communication terminal device to retransmit the PSSCH message in a beam direction corresponding to the selected NACK sequence.

In Example 15, the mobile radio communication terminal device of Example 13 or 14, wherein the NACK feedback resource information indicates a correspondence between the plurality of NACK sequences and beam directions, wherein in the correspondence the NACK sequences respectively corresponds to one of the beam directions.

In Example 16, the mobile radio communication terminal device of any of Examples 13 to 15, wherein the plurality of NACK sequences are a plurality of orthogonal NACK sequences, wherein each of the plurality of orthogonal NACK sequences are cyclic-shifts of a Zadoff-Chu (ZC) sequence.

In Example 17, the mobile radio communication terminal device of any of Examples 5 to 16, wherein the PSCCH/SCI message indicates a maximum number of repetitions of NACK sequence.

In Example 18, the mobile radio communication terminal device of any of Examples 1 to 17, wherein the one or more processors are further to cause the mobile radio communication terminal device to receive a NACK message includes a sequence including OFDM symbols and resource blocks.

In Example 19, the mobile radio communication terminal device of any of Examples 1 to 18, wherein the mobile radio communication terminal device is not configured to receive a ACK message responsive to the PSSCH message.

In Example 20, the mobile radio communication terminal device of any of Examples 1 to 19, wherein the PSSCH message is an initial groupcast message or a retransmission of the initial groupcast message.

Example 21 is a method implemented by a mobile radio communication terminal device including one or more processors coupled at least to a memory, the method including: transmitting a physical signal shared channel (PSSCH) message; receiving a non-acknowledgment (NACK) feedback message indicating the PSSCH message was not successfully decoded; and retransmitting the PSSCH message.

In Example 22, the method of Example 21, wherein retransmitting the PSSCH message comprises repeatedly retransmitting the PSSCH message until a number of retransmissions of the PSSCH message is less than a predetermined threshold and no subsequent NACK feedback message responsive to each retransmission of the PSSCH message is received.

In Example 23, the method of Example 21 or 22, further including, receiving a subsequent NACK message after retransmitting the PSSCH message.

In Example 24, the method of any of Examples 21 to 23, wherein transmitting the PSSCH message comprises transmitting a physical sidelink control channel/signal control information (PSCCH/SCI) message before transmitting the PSSCH message.

In Example 25, the method of Example 24, wherein the PSCCH/SCI message includes NACK feedback resource allocation information.

In Example 26, the method of Example 25, wherein the NACK feedback resource allocation information of the transmitted PSCCH/SCI message includes a start resource block (RB) index for the NACK feedback message.

In Example 27, the method of Example 25 or 26, wherein the NACK feedback resource allocation information of the transmitted PSCCH/SCI message includes information indicating a time interval between the NACK feedback message and scheduled PSSCH transmission.

In Example 28, the method of any of Examples 25 to 27, further including: transmitting, at one or more times, a plurality of beam-specific reference signals.

In Example 29, the method of Example 28, wherein the NACK feedback message is received from a select NACK resource from a plurality of NACK resource allocations, wherein the selected NACK resource indicates one of the plurality of beam-specific reference signals.

In Example 30, the method of Example 29, wherein the PSSCH message is retransmitted in a beam direction of the beam-specific reference signal associated with the selected NACK resource used for the NACK feedback message.

In Example 31, the method of any of Examples 28 to 30, wherein the NACK feedback resource information indicates the plurality of NACK resource allocations and the respective beam-specific reference signal associated with each of the NACK resource allocations.

In Example 32, the method of any of Examples 25 to 31, wherein the received NACK feedback message includes a selected NACK sequence from a plurality NACK sequences, wherein the selected NACK sequence indicates a beam direction for retransmission of the PSSCH message.

In Example 33, the method of Example 32, wherein the PSSCH message is retransmitted in a beam direction corresponding to the selected NACK sequence.

In Example 34, the method of Example 33, wherein the NACK feedback resource information indicates a correspondence between the plurality of NACK sequences and beam direction.

In Example 35, the method of Example 34, wherein the plurality of NACK sequences are a plurality of orthogonal NACK sequences, wherein each of the plurality of orthogonal NACK sequences are cyclic-shifts of a Zadoff-Chu (ZC) sequence.

In Example 36, the method of any of Examples 24 to 35, wherein the PSCCH/SCI message indicates a maximum number of repetitions.

In Example 36, the method of any of Examples 1 to 21, wherein the received NACK message includes a sequence including OFDM symbols and resource blocks.

In Example 37, the method of any of Examples 1 to 36, wherein the mobile radio communication terminal device does not to receive a ACK message after transmitting the PSSCH message.

Example 38 is a non-transitory computer-readable storage medium storing program instructions for operating a mobile radio communication terminal device, the program instructions when executed by one or more processors of the mobile radio communication terminal device cause the mobile radio communication terminal device to perform a method including: transmitting a physical signal shared channel (PSSCH) message; receiving a non-acknowledgment (NACK) feedback message indicating the PSSCH message was not successfully decoded by the second UE; and retransmitting the PSSCH message.

In Example 39, the non-transitory computer-readable storage medium of Example 38, wherein the program instructions cause the mobile radio communication terminal device to retransmit the PSSCH message in response to determining that a current number of retransmissions of the PSSCH message is less than a predetermined threshold.

In Example 40, the non-transitory computer-readable storage medium of Example 38 or 39, the method further including receiving a subsequent NACK message after retransmitting the PSSCH message.

Example 41 is a mobile radio communication terminal device including at least one receiver, at least one transmitter, and one or more processors operatively coupled to a memory to cause the mobile radio communication terminal device to: receive, via the at least one receiver, a transmitted physical signal shared channel (PSSCH) message, implement a decoding process on the received PSSCH message; and transmit, via the at least one transmitter, a non-acknowledgment (NACK) feedback message in response to the mobile radio communication terminal device not successfully decoding the PSSCH message, and ignore any subsequent received retransmission of the PSSCH message in response to successfully decoding the PSSCH message.

In Example 42, the mobile radio communication terminal device of Example 41, wherein the one or more processors are further to cause the mobile radio communication terminal device to receive, via the at least one receiver, a retransmission of the PSSCH message after sending the NACK message.

In Example 43, the mobile radio communication terminal device of Example 42, wherein the one or more processors are further to cause the mobile radio communication terminal device to implement the decoding process in response to receiving the retransmitted PSSCH message.

In Example 44, the mobile radio communication terminal device of Example 43, wherein the decoding process implemented in response to receiving the retransmitted PSSCH message successfully decodes the PSSCH message based on at least the retransmitted PSSCH message.

In Example 45, the mobile radio communication terminal device of any of Examples 41 to 44, wherein the one or more processors are further to cause the mobile radio communication terminal device to receive, via the at least one receiver, prior to receiving the PSSCH message, a physical sidelink control channel/signal control information (PSCCH/SCI) message.

In Example 46, the mobile radio communication terminal device of Example 45, wherein the PSCCH/SCI message includes NACK feedback resource allocation information.

In Example 47, the mobile radio communication terminal device of Example 46, wherein the NACK feedback resource allocation information of the PSCCH/SCI message includes a start resource block (RB) index for the NACK feedback message.

In Example 48, the mobile radio communication terminal device of Example 46 or 47, wherein the NACK feedback resource allocation information of the transmitted PSCCH/SCI message includes information indicating a time interval between the NACK feedback message and scheduled PSSCH transmission.

In Example 49, the mobile radio communication terminal device of any of Examples 46 to 48, wherein the one or more processors are further to cause the mobile radio communication terminal device to receive, via the at least one receiver, at one or more times, a plurality of beam-specific reference signals.

In Example 50, the mobile radio communication terminal device of Example 49, wherein the one or more processors are further to cause the mobile radio communication terminal device to select a NACK resource from a plurality of NACK resource allocations indicated in the NACK feedback resource allocation information of the PSCCH/SCI message and transmit, via the at least one transmitter, the NACK feedback message using the selected NACK resource.

In Example 51, the mobile radio communication terminal device of Example 50, wherein the selected NACK resource indicates one of a plurality of the beam specific signals for retransmission of the PSSCH message.

In Example 52, the mobile radio communication terminal device of Example 51, wherein the NACK feedback resource allocation information of the received PSCCH/SCI message indicates the plurality of NACK resources and the plurality of beam specific signals respectively associated with the plurality of NACK resources.

In Example 53, the mobile radio communication terminal device of any of Examples 46 to 52, wherein the one or more processors are further to cause the mobile radio communication terminal device to transmit the NACK message including a NACK sequence.

In Example 54, the mobile radio communication terminal device of Example 53, wherein the NACK sequence is a NACK sequence selected by the mobile radio communication terminal device from a plurality of NACK sequences, and wherein the selected NACK sequence indicates a beam direction for retransmission of the PSSCH.

In Example 55, the mobile radio communication terminal device of Example 54, wherein the the one or more processors are further to cause mobile radio communication terminal device to receive the retransmitted PSSCH message from the beam direction indicated in the selected NACK sequence.

In Example 56, the mobile radio communication terminal device of Example 54 or 55, wherein the NACK feedback resource allocation information indicates a correspondence between the plurality of NACK sequences and beam directions.

In Example 57, the mobile radio communication terminal device of any of Examples 54 to 56, wherein the plurality of NACK sequences are a plurality of orthogonal NACK sequences, wherein each of the plurality of orthogonal NACK sequences are a cyclic shift of a Zadoff-Chu (ZC) sequence.

In Example 58, the mobile radio communication terminal device of any of Examples 54 to 57, wherein the NACK sequence includes a plurality of orthogonal frequency divisional multiplex (OFDM) symbols and resource blocks (RBs).

In Example 59, the mobile radio communication terminal device of any of Examples 46 to 58, wherein the feedback resource allocation information of the PSCCH/SCI message includes indicates a maximum number of repetitions for NACK message, and wherein the one or more processors are further to cause the mobile radio communication terminal device to retransmit the NACK message less than or equal to the maximum number of repetitions for NACK transmission.

In Example 60, the mobile radio communication terminal device of Example 59, wherein the one or more processors are further to cause the mobile radio communication terminal device to calculate an actual number of repetitions for transmitting the NACK message based on calculating a pathloss estimation of the received PSSCH message or PSCCH/SCI message, wherein the actual number of repetitions for transmitting the NACK message is less than or equal to the maximum number of repetitions.

Example 61 is a method implemented by a mobile radio communication terminal device including one or more processors coupled at least to a memory including: receiving a physical signal shared channel (PSSCH) message, implementing a decoding process on the received PSSCH message; and transmitting a non-acknowledgment (NACK) feedback message in response to not successfully decoding the PSSCH message.

In Example 62, the method of Example 61, further including receiving a retransmission of the PSSCH message after sending the NACK message.

In Example 63, the method of Example 62, further including implementing the decoding process in response to receiving the retransmitted PSSCH message.

In Example 64, the method of Example 63, wherein the decoding process implemented in response to receiving the retransmitted PSSCH message successfully decodes the PSSCH message based on at least the retransmitted PSSCH message.

In Example 65, the method of any of Examples 61 to 64, wherein the mobile radio communication terminal device is caused to receive, prior to receiving the PSSCH message, a physical sidelink control channel/signal control information (PSCCH/SCI) message.

In Example 66, the method of Example 65, wherein the PSCCH/SCI message includes NACK feedback resource allocation information.

In Example 67, the method of Example 66, wherein the NACK feedback resource allocation information of the PSCCH/SCI message includes a start resource block (RB) index for the NACK feedback message.

In Example 68, the method of Example 66 or 67, wherein the NACK feedback resource allocation information of the transmitted PSCCH/SCI message includes information indicating a time interval between the NACK feedback message and scheduled PSSCH transmission.

In Example 69, the method of any of Examples 66 to 68, wherein the mobile radio communication terminal device is further configured to receive, at one or more times, a plurality of beam-specific reference signals.

In Example 70, the method of Example 69, further including selecting a NACK resource from a plurality of NACK resource allocations indicated in the NACK feedback resource allocation information of the PSCCH/SCI message, wherein the NACK feedback message is transmitted using the selected NACK resource.

In Example 71, the method of Example 70, wherein the selected NACK resource indicates one of a plurality of the beam specific signals for retransmission of the PSSCH message.

In Example 72, the method of Example 70 or 71, wherein the NACK feedback resource allocation information of the received PSCCH/SCI message indicates the plurality of NACK resources and a one of the plurality of beam specific signals associated with each NACK resource.

In Example 73, the method of any of Examples 66 to 72, wherein the transmitted NACK message includes a NACK sequence.

In Example 74, the method of Example 73, further including selecting the NACK sequence from a plurality of NACK sequences, wherein the selected NACK sequence indicates a beam direction for retransmission of the PSSCH.

In Example 75, the method of Example 74, further including receiving a retransmitted PSSCH message from the beam direction indicated in the selected NACK sequence.

In Example 76, the method of Example 74 or 75, wherein the NACK feedback resource allocation information indicates a correspondence between the plurality of NACK sequences and beam directions.

In Example 77, the method of any of Examples 74 to 76, wherein the plurality of NACK sequences are a plurality of orthogonal NACK sequences, wherein each of the plurality of orthogonal NACK sequences are a cyclic shift of a Zadoff-Chu (ZC) sequence.

In Example 78, the method of any of Examples 61 to 77, wherein the NACK feedback message includes a plurality of orthogonal frequency divisional multiplex (OFDM) symbols and resource blocks (RBs).

In Example 79, the method of any of Examples 67 to 78, wherein the feedback resource allocation information of the PSCCH/SCI message includes indicates a maximum number of repetitions for NACK retransmission, and wherein the method comprises retransmitting the NACK message a number of times less than or equal to the maximum number of repetitions for NACK transmission.

In Example 80, the method of Example 79, further including calculating an actual number of repetitions for retransmitting the NACK message based on calculating a pathloss estimation of the received PSSCCH message or PSCCH/SCI message, wherein the actual number of repetitions for retransmitting the NACK message is less than or equal to the maximum number of repetitions.

Example 81 is a non-transitory computer-readable storage medium storing program instructions for operating a mobile radio communication terminal device, the program instructions when executed by one or more processors of the mobile radio communication terminal device cause the mobile radio communication terminal device to perform a method including: receiving a physical signal shared channel (PSSCH) message; implementing a decoding process on the received PSSCH message; and transmitting a non-acknowledgment (NACK) feedback message in response to not successfully decoding the PSSCH message; ignoring any subsequent received retransmission of the PSSCH message in response to successfully decoding the PSSCH message.

In Example 82, the non-transitory computer-readable storage medium of Example 81, wherein the performed method further includes receiving a retransmission of the PSSCH message after sending the NACK message.

In Example 83, the non-transitory computer-readable storage medium of Example 82, wherein the performed method further includes implementing the decoding process in response to the received retransmitted PSSCH message.

In Example 84, the non-transitory computer-readable storage medium of Example 83, wherein the decoding process implemented in response to receiving the retransmitted PSSCH message successfully decodes the PSSCH message based on at least the retransmitted PSSCH message.

In Example 85, the non-transitory computer-readable storage medium of any of Examples 81 to 84, wherein the method further comprises receiving, prior to receiving the PSSCH message, a PSCCH/SCI message.

In Example 86, the non-transitory computer-readable storage medium of Example 85, wherein the PSCCH/SCI message includes NACK feedback resource allocation information.

It should be noted that one or more of the features of any of the examples above may be combined with any one of the other examples.

Abbreviations

For the purposes of the present document, the following abbreviations may apply to the examples and embodiments discussed herein.

3GPP Third Generation Partnership Project
4G Fourth Generation
5G Fifth Generation
5GC 5G Core network
ACK Acknowledgement
AF Application Function
AM Acknowledged Mode
AMBR Aggregate Maximum Bit Rate
AMF Access and Mobility Management Function
AN Access Network
ANR Automatic Neighbour Relation
AP Application Protocol, Antenna Port, Access Point
API Application Programming Interface
APN Access Point Name
ARP Allocation and Retention Priority
ARQ Automatic Repeat Request
AS Access Stratum
ASN.1 Abstract Syntax Notation One
AUSF Authentication Server Function
AWGN Additive White Gaussian Noise
BCH Broadcast Channel
BER Bit Error Ratio
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CFRA Contention Free Random Access
CG Cell Group
CI Cell Identity
CID Cell-ID (e.g., positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power
CSI-RSRQCSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot E-LAN Ethernet Local Area Network
E2E End-to-End
ECCA extended clear channel assessment, extended CCA
ECCE Enhanced Control Channel Element, Enhanced CCE
ED Energy Detection
EDGE Enhanced Datarates for GSM Evolution (GSM Evolution)
EGMF Exposure Governance Management Function
EGPRS Enhanced GPRS
EIR Equipment Identity Register
eLAA enhanced Licensed Assisted Access, enhanced LAA
EM Element Manager
eMBB enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Channel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sistema (Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GSM Global System for Mobile Communications, Groupe Special Mobile
GTP GPRS Tunneling Protocol
GTP-U GPRS Tunnelling Protocol for User Plane
GUMMEI Globally Unique MME Identifier
GUTI Globally Unique Temporary UE Identity
HARQ Hybrid ARQ, Hybrid Automatic Repeat Request
HANDO, HO Handover
HFN HyperFrame Number
HHO Hard Handover
HLR Home Location Register
HN Home Network
HPLMN Home Public Land Mobile Network
HSDPA High Speed Downlink Packet Access
HSN Hopping Sequence Number
HSPA High Speed Packet Access
HSS Home Subscriber Server
HSUPA High Speed Uplink Packet Access
HTTP Hyper Text Transfer Protocol
HTTPS Hyper Text Transfer Protocol Secure (https is http/1.1 over SSL, i.e. port 443)
I-Block Information Block
ICCID Integrated Circuit Card Identification
ICIC Inter-Cell Interference Coordination
ID Identity, identifier
IDFT Inverse Discrete Fourier Transform
IE Information element
IEEE Institute of Electrical and Electronics Engineers
IEI Information Element Identifier
IEIDL Information Element Identifier Data Length
IETF Internet Engineering Task Force
IF Infrastructure
IM Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN
K Constraint length of the convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LBT Listen Before Talk
LCM LifeCycle Management
LCR Low Chip Rate
LCS Location Services
LI Layer Indicator
LLC Logical Link Control, Low Layer Compatibility
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering context)
MAC Message authentication code (security/encryption context)
MAC-A MAC used for authentication and key agreement (TSG T WG3 context)
MAC-1 MAC used for data integrity of signalling messages (TSG T WG3 context)
MANO Management and Orchestration
MBMS Multimedia Broadcast and Multicast Service
MBSFN Multimedia Broadcast multicast service Single Frequency Network
MCC Mobile Country Code
MCG Master Cell Group
MCOT Maximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIMO Multiple Input Multiple Output
MLC Mobile Location Centre
MM Mobility Management
MME Mobility Management Entity
MN Master Node
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
MSC Mobile Switching Centre
MSI Minimum System Information, MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTC massize MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non-Access Stratum layer
NCT Network Connectivity Topology
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NSSAI Network Slice Selection Assistance Information
S-NNSAI Single-NSSAI
NSSF Network Slice Selection Function
NW Network
NWUS Narrowband wake-up signal, Narrowband WUS
NZP Non-Zero Power
O&M Operation and Maintenance
ODU2 Optical channel Data Unit—type 2
OFDM Orthogonal Frequency Division Multiplexing
OFDMA Orthogonal Frequency Division Multiple Access
OOB Out-of-band
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
PCell Primary Cell
PCI Physical Cell ID, Physical Cell Identity
PCEF Policy and Charging Enforcement Function
PCF Policy Control Function
PCRF Policy Control and Charging Rules Function PDCP Packet Data Convergence Protocol, Packet Data Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit
PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
RIV Resource indicator value
RL Radio Link
RLC Radio Link Control, Radio Link Control layer
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Service Discovery Protocol (Bluetooth related)
SDSF Structured Data Storage Function
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block, SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio
SSS Secondary Synchronization Signal
SST Slice/Service Types
SU-MIMO Single User MIMO
SUL Supplementary Uplink
TA Timing Advance, Tracking Area
TAC Tracking Area Code
TAG Timing Advance Group
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus
USIM Universal Subscriber Identity Module
USS UE-specific search space
UTRA UMTS Terrestrial Radio Access
UTRAN Universal Terrestrial Radio Access Network
UwPTS Uplink Pilot Time Slot
V2I Vehicle-to-Infrastruction
V2P Vehicle-to-Pedestrian
V2V Vehicle-to-Vehicle
V2X Vehicle-to-everything
VIM Virtualized Infrastructure Manager
VL Virtual Link,
VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over-Internet Protocol
VPLMN Visited Public Land Mobile Network
VPN Virtual Private Network
VRB Virtual Resource Block
WiMAX Worldwide Interoperability for Microwave Access
WLAN Wireless Local Area Network
WMAN Wireless Metropolitan Area Network
WPAN Wireless Personal Area Network
X2-C X2-Control plane
X2-U X2-User plane
XML eXtensible Markup Language
XRES EXpected user RESponse
XOR eXclusive OR
ZC Zadoff-Chu
ZP Zero Power In the present disclosure, "SMTC" refers to an SSB-based measurement timing configuration configured by SSB-MeasurementTimingConfiguration;

"SSB" refers to an SS/PBCH block; "field" may refer to individual contents of an information element;

"information element" refers to a structural element containing a single or multiple fields;

a "Primary Cell" refers to the MCG cell, operating on the primary frequency, in which the UE either performs the initial connection establishment procedure or initiates the connection re-establishment procedure;

a "Primary SCG Cell" refers to the SCG cell in which the UE performs random access when performing the Reconfiguration with Sync procedure for DC operation;

a "Secondary Cell" refers to a cell providing additional radio resources on top of a Special Cell for a UE configured with CA;

a "Secondary Cell Group" refers to the subset of serving cells comprising the PSCell and zero or more secondary cells for a UE configured with DC;

a "Serving Cell" refers to the primary cell for a UE in RRC_CONNECTED not configured with CA/DC there is only one serving cell comprising of the primary cell;

a "serving cell" or "serving cells" refers to the set of cells comprising the Special Cell(s) and all secondary cells for a UE in RRC_CONNECTED configured with CA/DC; and a "Special Cell" refers to the PCell of the MCG or the PSCell of the SCG for DC operation; otherwise, the term "Special Cell" refers to the PCell.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile radio communication terminal device, comprising:
   at least one receiver;
   at least one transmitter; and
   one or more processors operatively coupled to a non-transitory memory that stores computer readable software, wherein the computer readable software, when executed by the one or more processors, causes the mobile radio communication terminal device to:
      transmit, via the at least one transmitter, to at least a second mobile radio communication terminal device:
         a sidelink control information (SCI) that includes first information; and
         a physical sidelink shared channel (PSSCH) transport block;
      receive, via the at least one receiver, either a negative-acknowledgment (NACK) feedback message from the second mobile radio communication terminal device or no response, wherein:
         when the NACK feedback message is received, it indicates the PSSCH transport block was not successfully decoded, and
         when no response is received, an acknowledgement (ACK) for the PSSCH transport block is indicated;
      wherein a resource block and cyclic shift of a sequence for the NACK feedback message are determinable based on the first information included in the SCI; and
      determine whether or not to perform a retransmission of the PSSCH transport block based on receiving the NACK feedback message or no response.

2. The mobile radio communication terminal device of claim 1, wherein said determining whether or not to perform a retransmission of the PSSCH transport block comprises:
   determining a number of retransmissions of the PSSCH transport block by the mobile radio communication terminal device is less than a threshold; and
   determining to perform a retransmission of the PSSCH transport block based on said determination that the number of retransmissions is less than the threshold.

3. The mobile radio communication terminal device of claim 2,
   wherein the computer readable software causes the mobile radio communication terminal to determine not to perform a retransmission of the PSSCH transport block by determining whether the current number of retransmissions of the PSSCH transport block is equal to the threshold.

4. The mobile radio communication terminal device of claim 1,
   wherein the computer readable software causes the mobile radio communication terminal device to receive a subsequent NACK message after performing a retransmission of the PSSCH transport block.

5. The mobile radio communication terminal device of claim 1, wherein the SCI message includes NACK feedback resource allocation information.

6. The mobile radio communication terminal device of claim 5, wherein the computer readable software causes the mobile radio communication terminal device to transmit, at one or more times, a plurality of beam-specific reference signals.

7. The mobile radio communication terminal device of claim 6, wherein the computer readable software causes the mobile radio communication terminal device to receive a NACK feedback message from a selected NACK resource from one of a plurality of NACK resource allocations,
   wherein the selected NACK resource is to indicate one of the plurality of beam-specific reference signals.

8. The mobile radio communication terminal device of claim 7, wherein the computer readable software causes the mobile radio communication terminal device to perform a retransmission of the PSSCH transport block in a beam direction of the beam-specific reference signal associated with the selected NACK resource used for the NACK feedback message.

9. The mobile radio communication terminal device of claim 5,
   wherein the NACK feedback message includes a selected NACK sequence from a plurality NACK sequences, the selected NACK sequence indicating a beam direction for retransmission of the PSSCH transport block.

10. The mobile radio communication terminal device of claim 9, wherein the computer readable software causes the mobile radio communication terminal device to perform a retransmission of the PSSCH transport block in the beam direction.

11. A mobile radio communication terminal device comprising:
    at least one receiver;
    at least one transmitter; and
    one or more processors operatively coupled to a non-transitory memory that stores computer readable software, wherein the computer readable software, when executed by the one or more processors, causes the mobile radio communication terminal device to:
       receive, via the at least one receiver, a transmitted physical signal shared channel (PSSCH) transport block from a second mobile radio communication terminal device;
       implement a decoding process on the received PSSCH transport block;
       in response to the mobile radio communication terminal device not successfully decoding the PSSCH transport block, transmit, via the at least one transmitter, a negative-acknowledgment (NACK) feedback message to the second mobile radio communication terminal device; and
       in response to the mobile radio communication terminal device successfully decoding the PSCCH transport block:
          not transmit an acknowledgement (ACK) feedback message to the second mobile radio communication terminal device; and ignore any subsequent received retransmission of the PSSCH transport block.

12. The mobile radio communication terminal device of claim 11, wherein the computer readable software causes the mobile radio communication terminal device to:
receive a retransmission of the PSSCH transport block after sending the NACK message.

13. The mobile radio communication terminal device of claim 11, wherein the computer readable software causes the mobile radio communication terminal device to receive, a sidelink control information (SCI) message.

14. The mobile radio communication terminal device of claim 13, wherein the SCI message includes NACK feedback resource allocation information.

15. The mobile radio communication terminal device of claim 14, wherein the computer readable software causes the mobile radio communication terminal device to receive, at one or more times, a plurality of beam-specific reference signals.

16. The mobile radio communication terminal device of claim 15, wherein the computer readable software causes the mobile radio communication terminal device to select a NACK resource from a plurality of NACK resource allocations indicated in the NACK feedback resource allocation information of the SCI message and transmit the NACK feedback message using the selected NACK resource wherein the selected NACK resource indicates one of a plurality of the beam-specific reference signals for retransmission of the PSSCH transport block.

17. A method comprising:
provide for transmission to a remote mobile radio communication terminal device:
 a sidelink control information (SCI) that includes first information; and
 a physical sidelink shared channel (PSSCH) transport block;
receive either a negative-acknowledgment (NACK) feedback message from the remote mobile radio communication terminal device or no response, wherein:
 when the NACK feedback message is received, it indicates the PSSCH transport block was not successfully decoded, and
 when no response is received, and acknowledgement (ACK) for the PSSCH transport block is indicated;
wherein a resource block and cyclic shift of a sequence for the NACK feedback message are determinable based on the first information included in the SCI; and
determine whether or not to perform a retransmission of the PSSCH transport block based on receiving the NACK feedback message or no response.

18. The mobile radio communication terminal device of claim 1, further comprising:
perform a retransmission, via the at least one receiver, of the PSSCH transport block if the mobile radio communication terminal device determines to perform a retransmission the PSSCH transport block, and not perform a retransmission the PSSCH transport block if the mobile radio communication terminal device determines not to perform a retransmission the PSSCH transport block.

* * * * *